United States Patent
Lee

(10) Patent No.: US 9,677,974 B2
(45) Date of Patent: *Jun. 13, 2017

(54) METHOD, SYSTEM AND APPARATUS FOR ASSESSING WHEEL CONDITION ON A VEHICLE

(71) Applicant: Keith Lee, Richmond Hill (CA)

(72) Inventor: Keith Lee, Richmond Hill (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/173,045

(22) Filed: Jun. 3, 2016

(65) Prior Publication Data

US 2016/0282228 A1  Sep. 29, 2016

Related U.S. Application Data

(63) Continuation of application No. 14/536,411, filed on Nov. 7, 2014, now Pat. No. 9,377,379, which is a continuation-in-part of application No. 13/791,404, filed on Mar. 8, 2013, now abandoned.

(51) Int. Cl.
| | |
|---|---|
| *G01B 11/26* | (2006.01) |
| *G01M 17/04* | (2006.01) |
| *G01M 17/02* | (2006.01) |
| *G01M 17/013* | (2006.01) |
| *G01B 11/275* | (2006.01) |

(52) U.S. Cl.
CPC ........... *G01M 17/04* (2013.01); *G01B 11/275* (2013.01); *G01B 11/2755* (2013.01); *G01M 17/013* (2013.01); *G01M 17/02* (2013.01); *G01B 2210/20* (2013.01)

(58) Field of Classification Search
CPC ...... G01B 11/275; G01M 17/02; G01M 17/04
See application file for complete search history.

(56) References Cited

U.S. PATENT DOCUMENTS

| | | |
|---|---|---|
| 4,123,023 A | 10/1978 | Nelson |
| 4,153,131 A | 5/1979 | Sakata et al. |
| 4,341,021 A | 7/1982 | Beissbarth |
| 4,863,266 A | 9/1989 | Masuko et al. |
| 4,899,218 A | 2/1990 | Waldecker et al. |
| 5,220,399 A | 6/1993 | Christian et al. |
| 5,532,816 A | 7/1996 | Spann et al. |
| 5,600,435 A | 2/1997 | Bartko et al. |
| 5,818,574 A | 10/1998 | Jones et al. |

(Continued)

FOREIGN PATENT DOCUMENTS

| | | |
|---|---|---|
| CA | 741064 A | 8/1966 |
| CA | 2085772 C | 6/1993 |

(Continued)

OTHER PUBLICATIONS

Harrysacz, "How to Choose a Wheel Offset", Dec. 29, 2008, http://www.ebay.com/gds/How-To-Choose-Wheel-Offset-/10000000001639843/g.html.

(Continued)

*Primary Examiner* — Luke Ratcliffe
*Assistant Examiner* — Samantha K Abraham
(74) *Attorney, Agent, or Firm* — Millman IP Inc.

(57) ABSTRACT

A method of assessing a condition of a wheel on a vehicle is provided and includes driving the vehicle in a generally longitudinal direction; contactlessly determining a distance to a first location on the wheel; contactlessly determining a distance to a second location on the wheel at a second time that is later than the first time; determining an indication of a tire-wearing angle for the wheel based on the distance to the first location and the distance to the second location; and outputting the indication of the tire wearing angle for the wheel.

11 Claims, 6 Drawing Sheets

(56) References Cited

U.S. PATENT DOCUMENTS

| | | |
|---|---|---|
| 5,978,077 A | 11/1999 | Koerner et al. |
| 6,400,451 B1 | 6/2002 | Fukuda et al. |
| 6,412,183 B1 | 7/2002 | Uno |
| 6,414,304 B1 | 7/2002 | Boess et al. |
| 6,545,750 B2 | 4/2003 | Roth et al. |
| 6,559,936 B1 | 5/2003 | Colombo et al. |
| 6,657,711 B1 | 12/2003 | Kitagawa et al. |
| 7,177,740 B1 | 2/2007 | Guangjun et al. |
| 7,336,350 B2 | 2/2008 | Dorrance et al. |
| 7,454,841 B2 | 11/2008 | Burns, Jr. et al. |
| 7,774,946 B2 | 8/2010 | Boni et al. |
| 7,864,309 B2 | 1/2011 | De Sloovere et al. |
| 8,107,062 B2 | 1/2012 | De Sloovere et al. |
| 2003/0094039 A1 | 5/2003 | Poulbot |
| 2006/0152711 A1 | 7/2006 | Dale, Jr. et al. |
| 2007/0044537 A1 | 3/2007 | Knox |
| 2010/0180676 A1 | 7/2010 | Braghiroli et al. |
| 2011/0052041 A1 | 3/2011 | Nobis et al. |

FOREIGN PATENT DOCUMENTS

| | | |
|---|---|---|
| CA | 2187980 A1 | 4/1997 |
| EP | 0581990 A1 | 2/1994 |

OTHER PUBLICATIONS

PCT/CA2014/000228, International Search Report, Jun. 10, 2014.
U.S. Appl. No. 13/791,404, Non-Final Office Action, Sep. 12, 2014.
U.S. Appl. No. 14/536,411, Final Office Action, Oct. 23, 2015.
U.S. Appl. No. 14/536,411, Non-Final Office Action, Mar. 26, 2015.
EP14760254, Supplementary European Search Report, European Patent Office, Sep. 27, 2016.

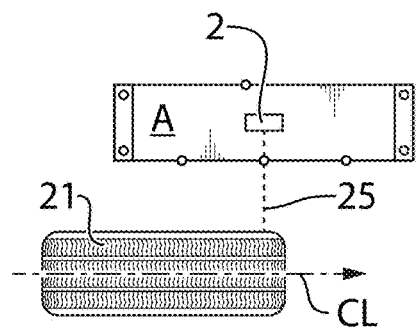 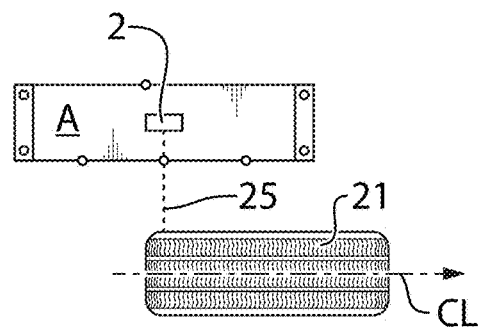
FIG. 4A  FIG. 4C
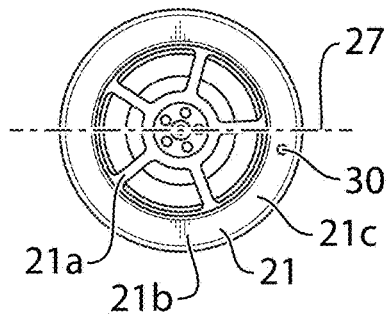 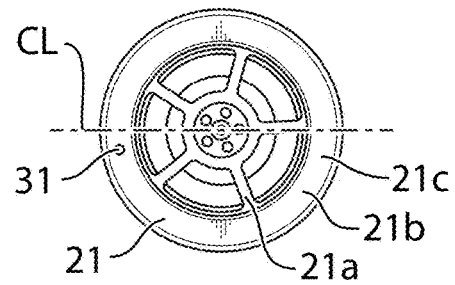
FIG. 4B  FIG. 4D
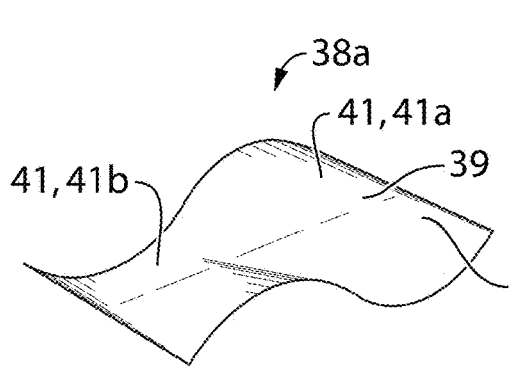 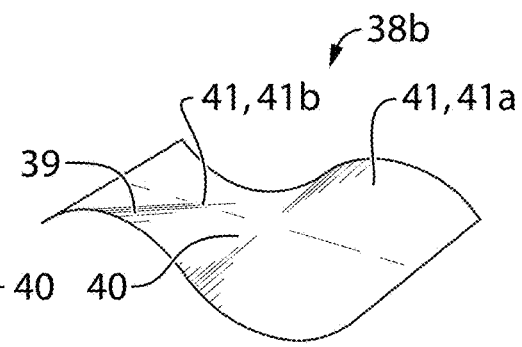
FIG. 5A  FIG. 5B

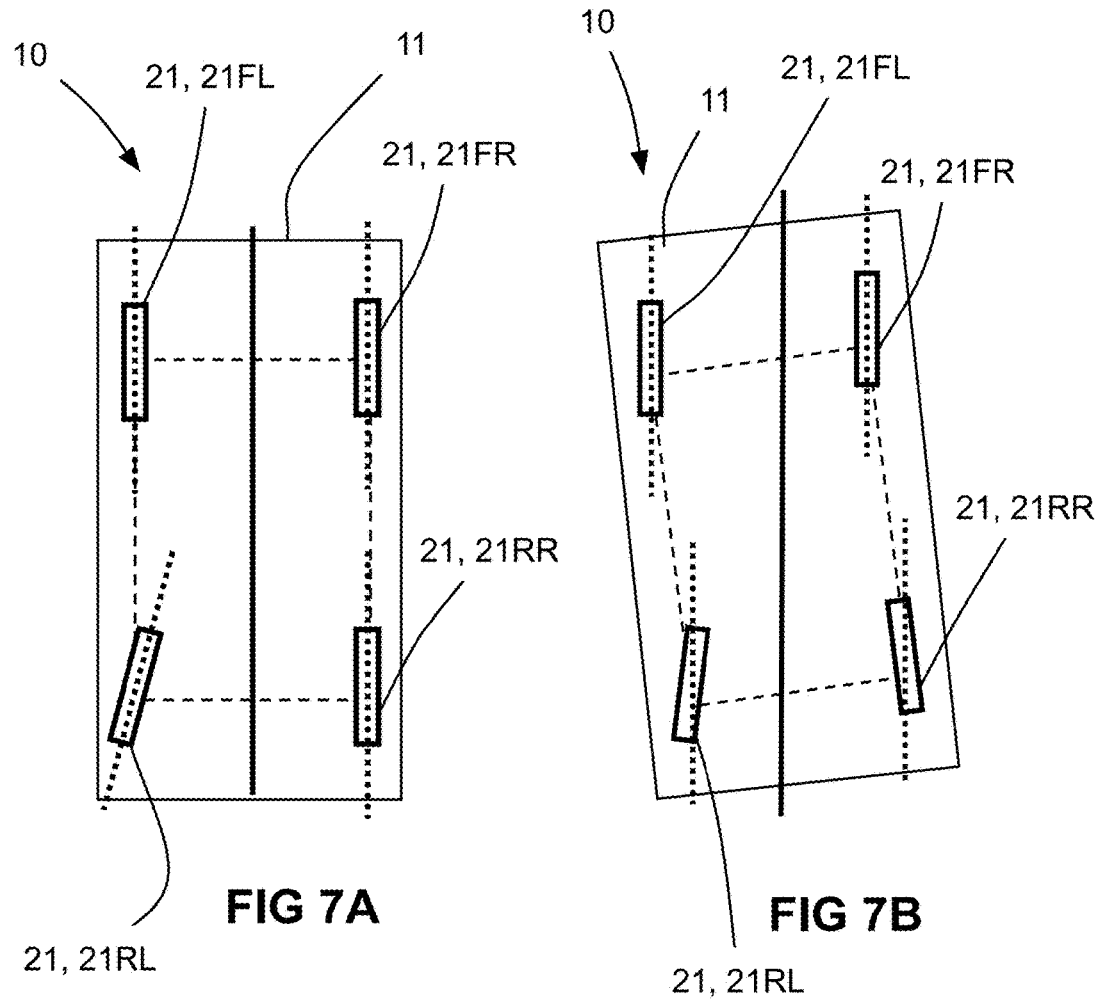
FIG 7A   FIG 7B
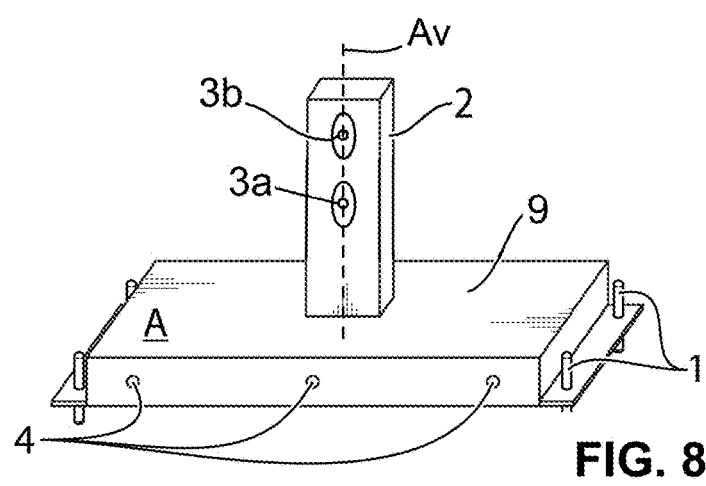
FIG. 8

METHOD, SYSTEM AND APPARATUS FOR ASSESSING WHEEL CONDITION ON A VEHICLE

CROSS-REFERENCE TO RELATED APPLICATIONS

This application is a continuation of U.S. patent application Ser. No. 14/536,411 filed Nov. 7, 2014, which claims the benefit of priority to U.S. patent application Ser. No. 13/791,404 filed Mar. 8, 2013, the contents of which are incorporated herein in their entirety.

FIELD OF THE INVENTION

The present invention relates to methods, systems and apparatuses for assessing the condition of a wheel on a vehicle, particularly to methods, systems and apparatuses where off-vehicle equipment is used to make the assessment.

BACKGROUND OF THE INVENTION

Vehicle wheels are the part of a vehicle in contact with a driving surface, such as a road, and bear the entire weight of the vehicle during its operation. As such, it is important to monitor wheel condition, for example wheel alignment, wheel suspension and tire inflation, to determine whether maintenance needs to be performed to ensure optimal performance and safety of the vehicle.

The prior art is replete with systems for performing wheel alignment assessment. Most of these systems require equipment mounted on the wheels to assist in wheel alignment assessment and require the vehicle to be hoisted on to or otherwise mounted on to rollers or other apparatuses. A number of non-contact or contactless systems have been developed that employ optical measuring means, for example United States patents and Published Patent Applications: U.S. Pat. No. 6,545,750; U.S. Pat. No. 5,532,816; U.S. Pat. No. 4,899,218; U.S. Pat. No. 5,818,574; U.S. Pat. No. 6,400,451; U.S. Pat. No. 4,863,266; U.S. Pat. No. 7,336,350; U.S. Pat. No. 8,107,062; U.S. Pat. No. 7,864,309; U.S. Pat. No. 7,177,740; U.S. Pat. No. 6,657,711; U.S. Pat. No. 5,978,077; U.S. Pat. No. 7,454,841; U.S. Pat. No. 7,774,946; and US 2006/0152711, the entire contents of all of which are herein incorporated by reference. These systems involve laser displacement sensors, laser illumination, cameras or some combination thereof. Most of them require the vehicle to be stationary while the system operates. Some involve rotation of the wheels. Various parts of the wheel, including the tire sidewalls, can be used as targets for the lasers and/or cameras.

In one example, U.S. Pat. No. 5,532,816 discloses a contactless system for determining vehicle wheel alignment in which a point on a rotating wheel is tracked by a laser tracking unit to generate a signal directly representative of the rotational plane of the wheel. This signal is compared to a mathematically stored model to determine wheel alignment conditions. Both the vehicle and laser tracking unit are translationally stationary with respect to each other. The actual laser rotates to be able to follow the point on the rotating wheel.

In U.S. Pat. No. 5,532,816 the vehicle is mounted on rollers to allow the wheels to turn while the vehicle itself does not move. It would be advantageous to have a system that could make wheel alignment assessments while the vehicle itself is moving, for example while it is being driven into a garage or test station. Only a very few prior art systems are configured to permit wheel alignment assessment while the vehicle itself is moving.

U.S. Pat. No. 6,545,750 discloses a system for determining the dynamic orientation of a vehicle wheel plane. The system involves an orientation determining device that is not mounted on the vehicle or vehicle wheels. The orientation determining device remains stationary as a vehicle is driven by it and the device takes measurements on the wheel as the wheel passes by. The wheel is preferably outfitted with a reflective test surface. The orientation determining device comprises three transducers that emit beams of e/m radiation (e.g. lasers). The beams reflect off the test surface (or wheel hub) at three non-collinear points and the distance information from the three points is used to calculate wheel orientation at one specific instance in time. This system uses distance information from three separate laser beams to measure the distance to three different points on the wheel at a single instance in time. However, because the system is making measurements at only a single instance in time, it provides data only on wheel alignment, not on other wheel conditions such as wheel suspension and/or tire inflation. Further, acquiring data simultaneously on three non-collinear points on a wheel hub is difficult, so a reflective test surface is preferably mounted on the wheel, making the system more laborious and less useful for "on the go" wheel alignment assessment.

There remains a need for a simple method and apparatus for assessing the condition of a wheel on a vehicle while the vehicle is being driven and without the need to mount any equipment on the vehicle.

SUMMARY OF THE INVENTION

A method of assessing a condition of a wheel on a vehicle is provided and includes: driving the vehicle in a generally longitudinal direction; contactlessly determining a distance to a first location on the wheel; contactlessly determining a distance to a second location on the wheel at a second time that is later than the first time; determining an indication of a tire-wearing angle for the wheel based on the distance to the first location and the distance to the second location; and outputting the indication of the tire wearing angle for the wheel.

There is further provided a method for assessing play in suspension elements that hold a wheel of a vehicle, comprising: driving the vehicle so that the wheel passes over a suspension testing surface comprising at least first and second undulations which slant downwards laterally towards opposing sides from each other; determining an offset for the wheel at a point on the first undulation and at a point on the second undulation using the method described above; and determining whether there is play in the suspension elements based on a difference in the offsets between the two points.

There is further provided an apparatus for determining an offset between two locations on a wheel on a vehicle at two different times, the apparatus comprising: a first displacement sensor not on the vehicle and fixed in position during operation of the apparatus for determining distance along a fixed path from the apparatus to the wheel on the moving vehicle, and one or more further displacement sensors fixed in position during operation of the apparatus for confirming that the wheel is passing the first displacement sensor.

There is further provided a system for assessing a condition of a wheel on a vehicle, the system comprising: an apparatus for generating output signals indicative of distances to two locations on the wheel at two different times while the vehicle is moving on a surface, the apparatus not moving during operation; and, a control system configured to receive the output signals from the apparatus and to output data based on the distances to the two locations.

There is further provided a method of detecting a wheel on a vehicle, comprising: contactlessly (i.e. without physical contact) determining distances from a series of points on the moving vehicle to a fixed point not on the moving vehicle over a series of instants in time to generate distance data at each instant in time; at each instant in time, calculating an average of the distance data for a predetermined number of instants in time before and after said each instant in time; and, calculating variances of the distances at said each instance in time from the calculated averages, wherein a local minimum in the calculated average over consecutive instants in time and a small variance at each of the consecutive instants in time in comparison to the variance at other instants in time indicates passage of the wheel by the fixed point.

In the present invention, the offset between two locations on a wheel of a moving vehicle is determined. The offset is related to the difference in the distance from the first location to the fixed point in comparison to the distance from the second location to the fixed point. The offset is an indication of the tire wearing angle for the wheel, which is the angle between the wheel's orientation and the direction of movement of the vehicle 10. A tire wearing angle of zero exists for a wheel that is perfectly parallel to the longitudinal centerline of the vehicle. The offset may be determined by measuring the distance from a fixed point spaced from the vehicle to a first location on the wheel along a fixed path at a first instant in time and then measuring the distance from the same fixed point along the same fixed path to a second location on the wheel at a second instant in time after the vehicle has moved and the wheel has rotated.

To ensure that the two measurements are made at appropriate separate instants in time so that the two locations are on opposite sides of the axle and at similar locations on the wheel, it is useful to know the wheel dimensions. In practice, distance measurements can be made continuously across the entire width of the wheel and software is used to track the relative distances over time to develop a histogram or profile of the wheel. The histogram can be used to visually locate suitable data points representing locations on the wheel for use in the offset calculation. For example, the presence of the sidewall of the tire becomes very evident when the data is analyzed graphically with a histogram. The data may also be analyzed by a processor to determine the presence of the wheel, the appropriate data points representing the locations on the wheel from which to take the distance measurements, and hence the distances at the first and second locations.

Yet further, there is one point at a certain height on the wheel (about ⅓ of the way up from the driving surface) that will be substantially the same point measured twice thereby guaranteeing that the first and second locations are actually the same points on the wheel. This arises from the fact that the wheel is rotating while the vehicle is translating so by matching the rotational distance of the wheel on a concentric circle at a particular radius on the wheel to the translational distance of the vehicle, it is possible to always take the two measurements at the same spot on the wheel. This is one of the advantageous consequences of the taking the distance measurements at different times from a fixed point not on the vehicle while the vehicle is moving. While it is advantageous to measure precisely the same physical point on the wheel when measuring the forward point on the wheel and when measuring the rearward point on the wheel so as to eliminate any errors that can arise from a local deformation on the wheel, it is alternatively possible to achieve some portion of that advantage if the forward point measurement and the rearward point measurement are taken at locations on the wheel that are in a selected level of proximity to each other. For example, some advantage is achieved if the forward point and rearward point are taken at physical locations that are within 5 degrees of each other. Alternatively, they may be within 25 degrees of each other, or within 50 degrees of each other, or 75 degrees of each other, or even 90 degrees of each other. This advantage may be at least partially realized by measuring points that are between about 25% and about 40% of the height of the wheel.

By comparing the two distances, a difference in the two distances can be determined, i.e. the offset. The difference can be expressed as a linear measurement (e.g. in units of length such as millimeters or centimeters) or as an angular measurement (e.g. in degrees) where the angle is an angle formed between a reference line and the actual line formed between the two locations on the wheel as measured at the two different instants in time. The reference line is the line that is representative of the wheel in a perfectly aligned state. Preferably, the reference line is perpendicular to the fixed path. The offset provides an indication of whether or not the wheel is straight while the vehicle is moving. An offset of zero means the wheel has a tire wearing angle of zero. A non-zero value of the offset provides the value for the tire wearing angle. If the distance to the first location is less than to the second location, the wheel has a toe-out orientation. If the distance to the second location is less than to the first location, it has a toe-in orientation. The size of the offset that might indicate a wheel condition problem, e.g. an alignment problem, depends on the type of vehicle and size of the wheel. Offsets of less than 1 degree generally indicate that there is no alignment problem.

Distance measurements may be taken by any convenient means. Optical displacement sensors based on emission of any form of electromagnetic (e/m) radiation are preferred. Optical displacement sensors include, for example, laser displacement sensors. Visible light lasers are preferred. The sampling frequency of the displacement sensor generally does not matter, but should be high enough to ensure measurement accuracy depending on the speed of the vehicle. When collecting data on fast moving vehicles, higher sampling frequency is preferred. Sampling frequencies may be in a range of 100-750 Hz, for example. Laser displacement sensors typically function by emitting a beam of light and capturing the reflection with an optical sensor (e.g. a camera). The sensor is in a slightly different location in the displacement sensor than the laser emitter, so triangulation calculations are performed by a processor in the displacement sensor to determine the distance to the spot where the reflection occurred. Suitable optical laser displacement sensors include Acuity AR-700 Series, Keyence IL Series (e.g. Keyence IL-600 and Keyence IL-2000) and Micro Epsilon optoNCDT 1402 displacement sensors.

Especially when the first and second locations are located near the centerline of the wheel, the fixed path along which the distance measurements are taken is at a height where it may intersect with others parts of the vehicle, for example the chassis or fender. In such a case, the passage of some part of the chassis or fender may be mistakenly taken as the passage of the wheel leading to errors in the distance measurements. To alleviate this problem, additional distance measurements may be taken along a second fixed path at a level closer to the surface on which the vehicle is moving. Since the wheel is always on the ground, and at the lower level there is less likelihood of encountering features that might be mistaken as a wheel, when the additional distances change dramatically it will be known that a wheel is passing by. Thus, the distance measurements collected along the second fixed path can be used to confirm the passage of the wheel. It should be noted that the data from the second fixed path does not need to be used and is preferably not used to make the wheel condition assessment, e.g. alignment assessment, itself. These confirmatory distance measurements are made separately from the measurements at the first and second locations and can be made by any convenient means, for example one or more further optical displacement sensors (e.g. one or more lasers). To further reduce the risk of falsely identifying the passage of something other than the intended wheel, it is preferable to use at least three further distance determining means in a row parallel to the surface to confirm the passage of the wheel. This will not only help determine when a wheel is encountered but will also help determine when the wheel has passed. The further distance determining means can also be used to determine the direction of travel of the vehicle and the number of axles on the vehicle as each axle will have a wheel that passes by.

Because the present invention employs measurements while the vehicle is moving, it can also be used to determine whether there is play in wheel suspension. This ability to assess other wheel conditions besides alignment is advantageous. Play in wheel suspension can cause a wheel to be angled in or out depending on whether the vehicle is moving forward or backward past the fixed point. To determine play in wheel suspension, the vehicle is moved forward and the two distance measurements made. Then the vehicle is moved backward and the same two distance measurements are made. When moving backward, the first and second locations on the wheel are the same as the second and first locations when the vehicle is moving forward. If there is no play in the suspension, the sign of the offset between forward and backward motion of the vehicle should change. If a change in the sign of the offset direction is not seen, then there may be a suspension problem in one or both wheels being measured. Since, as discussed previously, wheel tracking problems may be caused by suspension play and the offset is also dependent on wheel tracking, such suspension information can be collected even when the wheels themselves are aligned properly.

For extremely large vehicles such as tractor-trailers, backing up the vehicle to help determine suspension problems is not practical. Further, heavy loads and/or extensive driving may cause the suspension of such a large vehicle to settle in. For these reasons, the surface on which the vehicle moves may be modified by introducing twists and raised patterns or bumps. This is conveniently accomplished with wavy patterned plates that can be placed on the surface over which the vehicle can move. The twists and raised patterns or bumps release the suspension from its settled mode and force play in the wheel if there is a suspension problem. If there is no suspension play, the wheel remains upright as it passes over the twists and no offset arises due to suspension play. If there is suspension play, the wheel tilts and offset in the two distance measurement arises.

Distance data generated and offset data calculated in the present invention may be processed by a control system, for example computers, and the data displayed in any suitable fashion, for example on a computer monitor, numerically and/or graphically. Means for taking distance measurements may be in communication with the one or more processors, for example electronically. Electronic communication may be through cables or wireless.

As provided in the present description, vehicles are generally motorized transportation having one or more wheels driven by a motor. Vehicles include cars, trucks, trailers, tractors, motorcycles, etc. and have a front, back, right side and left side. The front points to a forward direction while the back points to a backward or rearward direction. Vehicles may have all of their wheels in a single plane (e.g. motorcycles) or have multiple planes of wheels. Most common vehicles have two lines of wheels. Where the vehicle has multiple lines of wheels, the right side is a passenger side of the vehicle in North American model vehicles while the left side is a driver side in North American model vehicles.

The present invention provides a simple method, apparatus and system for preliminarily assessing one or more of a number of wheel conditions on a vehicle, including not only wheel alignment, but also wheel camber, wheel suspension and tire inflation. The invention can be employed while the vehicle is moving into a shop, garage or other testing facility without the need to mount anything on the vehicle or to hoist or otherwise mount the vehicle on a separate apparatus. If the invention indicates a problem with the condition of the wheel, a more precise intervention can be made to fix the problem. If not, a more laborious assessment is thereby avoided. The invention is equally applicable to small vehicles (e.g. cars) and large vehicles (e.g. transport trailers).

Further features of the invention will be described or will become apparent in the course of the following detailed description.

BRIEF DESCRIPTION OF DRAWINGS

In order that the invention may be more clearly understood, embodiments thereof will now be described in detail by way of example, with reference to the accompanying drawings, in which:

FIG. 4A is a schematic diagram of a top view of apparatus A depicted in the system of FIG. 1 showing a beam from a laser displacement sensor illuminating a tire at a first location on the tire sidewall;

FIG. 4B is a schematic diagram of a side view of the tire depicted in FIG. 4A showing the first location on the sidewall of the tire;

FIG. 4C is a schematic diagram of a top view of apparatus A depicted in the system of FIG. 1 showing a beam from a laser displacement sensor illuminating a tire at a second location on the tire sidewall after the vehicle has moved forward;

FIG. 4D is a schematic diagram of a side view of the tire depicted in FIG. 4C showing the second location on the sidewall of the tire;

FIG. 5A and FIG. 5B are schematic diagrams of wavy bumpy plates to assist in suspension testing of vehicle wheels;

FIG. 7A is a plan view of a vehicle with trauma to the rear left wheel;

FIG. 7B is a plan view illustrating the vehicle of FIG. 7A travelling; and

FIG. 8 is a perspective view of one of the apparatuses shown in FIG. 1, with an additional sensor for use in determining camber of a vehicle wheel.

DESCRIPTION OF PREFERRED EMBODIMENTS

Figure 1:
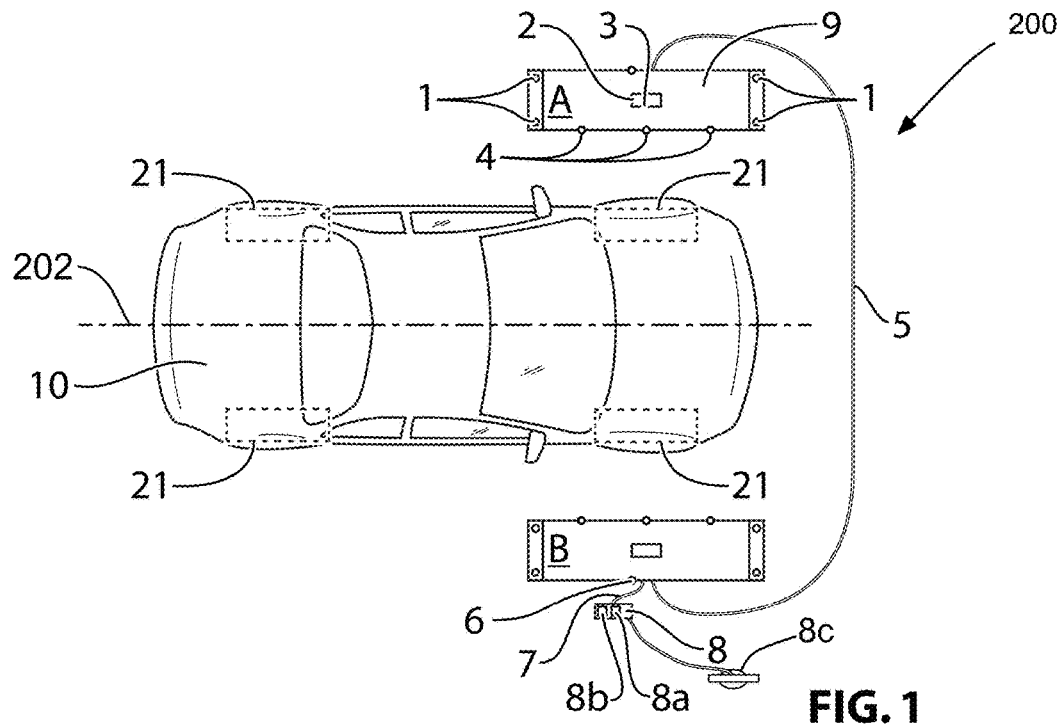
FIG. 1 is a schematic diagram showing a top view of a system of the present invention comprising two electronically connected apparatuses for determining offset of wheels on the left and right sides of a moving vehicle.

In this specification and in the claims, the use of the article "a", "an", or "the" in reference to an item is not intended to exclude the possibility of including a plurality of the item in some embodiments. It will be apparent to one skilled in the art in at least some instances in this specification and the attached claims that it would be possible to include a plurality of the item in at least some embodiments.

It has been found that, while the measurement of static toe (i.e. the measurement of toe when the vehicle is stationary) can be useful, there are several problems with it as a tool to determine whether a particular wheel or tire will incur undue wear during use of the vehicle. In general, when static toe is measured, the corners of a polygon are determined, wherein the corners correspond to the centers of each of the four wheels of the vehicle. The angle of each wheel is then determined relative to that rectangle. Depending on the vehicle's suspension and other factors, the orientation of the wheels when the vehicle is stationary are not the same as the orientation of the wheels during operation of the vehicle. An example of a static toe measurement is shown in FIG. 7A. The vehicle is shown at 10, and has a body 11 that is represented by a rectangle for simplicity. The vehicle 10 has four wheels shown at 21, and shown more particularly at 21FL (the front left wheel as viewed from a viewpoint above the vehicle 10), 21FR (the front right wheel), 21RL (the rear left wheel) and 21RR (the rear right wheel). As can be seen, there has been trauma to the vehicle's rear left wheel 21RL, causing it to be out of alignment with the other three wheels. A static toe measurement would find that the front left, front right and rear right wheels 21FL, 21FR and 21RR all have a toe of zero, and the rear left wheel 21RL has a toe value of some non-zero value. However, as can be seen in the view shown in FIG. 7B, when the vehicle 10 is being driven, due to particular dynamics involved, the rear left wheel 21RL may drive the direction of movement of the vehicle 10 more than the rear right wheel 21RR. The driver of the vehicle (not shown) may steer the vehicle 10 in an effort to compensate for the frictional forces that cause the right and left rear wheels 21RR and 21RL to urge the vehicle 10 in different directions. The resulting direction of travel of the vehicle 10 may be as shown in FIG. 7B. As can be seen, when the dynamic toe measurements would be taken, the front and rear toe values would be zero, and each of the rear toe values would be about ½ of the static toe value of the rear left wheel 21RL. As can be seen, both the right and left rear wheels 21RR and 21RL have non-zero tire wear angles relative to the direction of travel of the vehicle 10. Such a measurement would reveal that both the rear right and rear left wheels 21RR and 21RL have non-zero tire wearing angles and would thus incur wear.

Another issue relating to measurement of static toe is that, depending on how soft the vehicle's suspension is, and depending on whether there are any problems with suspension components, it may be possible to measure the static toe of the vehicle 10 and to find that all the wheels have a suitable toe value, but to find that the wheels 21 move depending on frictional and other forces that urge the wheels 10 to take on different toe values when the vehicle 10 is moving.

Figure 2:
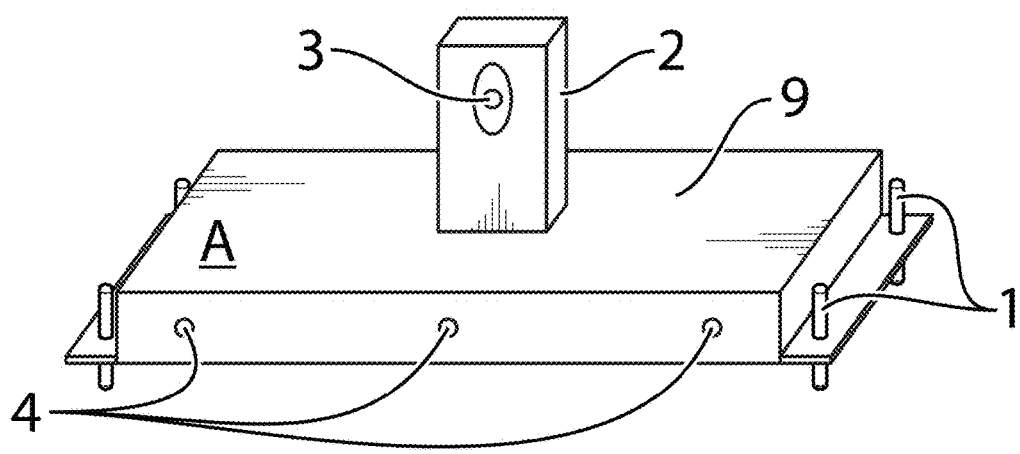
FIG. 2 is a schematic diagram showing a front view of apparatus A depicted in the system of FIG. 1.
Figure 3:
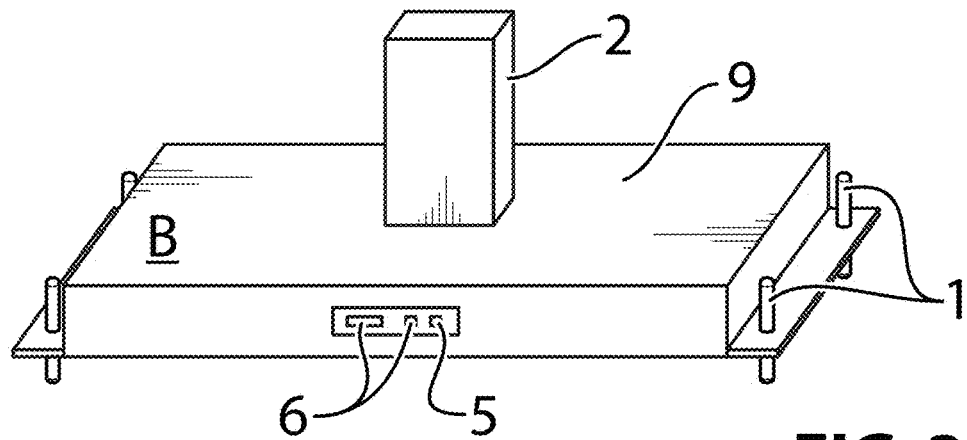
FIG. 3 is a schematic diagram showing a back view of apparatus B depicted in the system of FIG. 1.

FIG. 1 is a schematic diagram showing a top view of a system 200 that is configured to determine the tire wearing angles of a vehicle in accordance with an embodiment of the present invention. The system 200 comprising two electronically connected optical displacement sensing apparatuses A,B of the present invention for determining an offset in wheels on the left and right sides of a vehicle 10 that is moving forward past the apparatuses A,B in the direction of the arrow. FIG. 2 is a schematic diagram showing a front view of apparatus A. FIG. 3 is a schematic diagram showing a back view of apparatus B. Apparatuses A,B are identical and element numbering in FIGS. 1-3 applies equally to both.

Each apparatus A,B comprises tower 2 mounted on base 9 having height adjustable feet 1 at each corner of the base. Visible laser displacement sensor 3 is mounted fixedly in the tower and configured to emit a laser beam parallel to the surface on which the apparatus rests at a height that may be, for example, between about 25% and about 40% of the height of the vehicle wheel 21 and is preferably at a height of about one third of the height of the wheel 21. Displacement sensor 3 is used to determine distance to the vehicle's wheels 21 during operation of the apparatus. Three further laser displacement sensors 4 are mounted in a single row in the base and configured to emit laser beams parallel to the surface on which the apparatus rests at a height below the chassis of a typical vehicle. Further displacement sensors 4 are only used to confirm that a vehicle wheel 21 is passing the apparatus A,B (as opposed to some part of the vehicle body) and to confirm when the wheel 21 has passed the apparatus. Sensors 4 need not be laser displacement sensors and may operate on any other suitable principle. Sensors 4 may be referred to as wheel detection sensors. The two apparatuses A,B are electronically connected through a cable 5 and one of the apparatuses, in this case apparatus B, is electronically connected to computer 8 through cable 7 from a data port 6. The computer 8 is loaded with software for interpreting signals from all of the laser displacement sensors on both apparatuses to determine distances from the displacement sensors to the surfaces on which the laser beams impact. The software determines distances from each displacement sensor 3 to the vehicle's wheel 21. Only data from displacement sensors 3 are used in wheel condition assessment.

The computer 8 includes processor 8a, a memory 8b, and an output device 8c, which may be, for example, a display. The computer 8 is but one example of a control system. The control system may include a single processor and a single memory, or could have multiple processors and multiple memories. In the event of having a plurality of processors and memory, the processors and memory may be in a single housing, or may be distributed between a plurality of housings.

The height of the laser displacement sensor in each apparatus may optionally be adjusted by adjusting the height adjustable feet 1, to be at about one-third the diameter of the wheel 21 off the surface on which the wheel 21 is traveling. The height adjustable feet 1 may also be used to level the apparatus A,B on an uneven surface. The two apparatuses A,B may be positioned roughly across from each other and so that the beams from the laser displacement sensors 3 are roughly perpendicular to the direction of motion of the vehicle 10. Each apparatus A,B is an independent unit that is in no way attached to or mounted on the vehicle 10.

FIGS. 4A-4D depict a single apparatus (apparatus A) and illustrate the measurement of the offset for the front left wheel 21 of the vehicle 10. Referring to FIGS. 4B and 4D, the wheel 21 includes a rim and a tire, shown at 21a and 21b respectively. In the event that a hubcap is provided, the hubcap may be considered part of the rim for the purposes of this description. In operation, the apparatus A is stationary while the vehicle 10 moves forward past it in the direction of the arrow. As the vehicle 10 passes the apparatus A, the laser displacement sensor 3 sends signals back to the computer 8 at a selected frequency (e.g. 200 distance measurement signals per second), and the computer 8 calculates the distance that beam 25 travels to reach the vehicle 10. The computer 8 tracks and displays the distance data. The distance data for an example vehicle is shown in Tables 1 and 2, and is illustrated graphically in the form of histograms in FIGS. 6A and 6B.

The computer 8 determines the distances to two longitudinally spaced locations on the wheel 21, and determines the difference between the two distances, which is referred to as the offset, and which is indicative of the tire wearing angle of the wheel 21. Preferably, the two locations are on opposite sides of the centerpoint of the wheel. In other words, preferably, one location is on the leading half of the wheel 21 and on is on the trailing half of the wheel 21. Preferably, the two locations are on parts of the wheel 21 that have the same lateral distance to the longitudinal centerline of the wheel, shown at CL in FIGS. 4A and 4B. The locations could be on the tire sidewall (shown at 21c) or the rim or the hub of the wheel. For ease of detection, the locations may be at points of maximum lateral bulge (shown at 30 and 31 respectively in FIGS. 4B and 4D) for the tire 21b at whatever height the displacement sensor is operating, although other locations on the wheel 21 may be used. For example, the center of the tire sidewall 21c may also be a suitable location (the maximum lateral bulge on a tire is typically not at the center of the sidewall, but is instead closer to the radially outer edge of the tire 21b).

In the example shown in FIGS. 4A and 4B, as the vehicle wheel 21 passes the laser displacement sensor 3, beam 25 finds a point of maximum bulge 30 at a first instant in time on the leading part of tire 21b on the tire's sidewall about one-third the way up off the surface. At this point, a first distance is established, which is displayed by the computer 8. Referring to FIGS. 4C and 4D, as the vehicle 10 continues to move forward, sometime later at a second instant in time, a corresponding maximum bulge point 31 on the trailing part of tire 21b on the tire's sidewall passes by the beam 25 about one-third the way up off the surface. At this point, a second distance is determined, which is displayed by the computer 8. The computer 8 calculates the difference between the first and second distances, which is referred to as the offset. The offset may be converted to a value for the tire wearing angle for the wheel, expressed as an angle using trigonometric relationships if the longitudinal distance between the first and second locations is known. The longitudinal distance information may be inputted to the computer 8 prior to measuring the vehicle 10 based on the tire information provided on the sidewalls 21c of the tire 21. If the computer 8 determines that the value for the tire wearing angle is greater than a selected value, such as, for example, about 1 degree, the computer 8 may indicate to a user that there may be a wheel alignment problem (e.g. via output device 8c). Thus, the control system is configured to a) receive output signals from however many of the apparatuses A,B there are and to b) output data based on a difference between the distances to the two locations 30 and 31 on the wheel 21 that were determined. FIGS. 4A-4D may relate to determining the offset and value for the tire wearing angle for a first wheel 21 (e.g. the left, or driver's side, front wheel). Data from the other apparatus at the other side of the vehicle (e.g. the right, or passenger side, front wheel) is factored into the determination as to whether the difference is due to the vehicle 10 not tracking straight (i.e. perpendicularly to the emitted beams) as the vehicle passed the apparatuses A,B. If a significant offset is still found to exist, a test for a suspension problem may be undertaken by backing the vehicle past the apparatuses as described above.

Figure 1A:
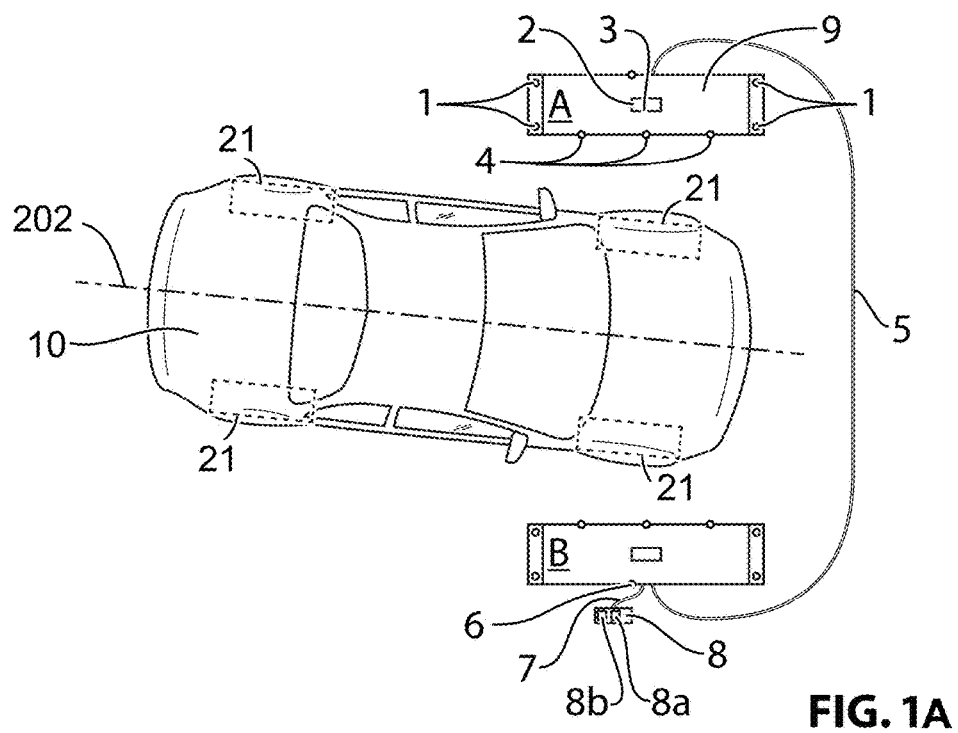
FIG. 1A is a schematic diagram showing a vehicle being driven through the system shown in FIG. 1, at an angle relative to the system.

It will be noted that, if the direction of travel of the vehicle 10 shown by arrow 202 in FIGS. 1 and 1a, is not perpendicular to the directions of travel of the beams 25 this will affect the offset that is determined for the wheels 21. In the example shown in FIG. 1, the vehicle 10 is traveling perpendicular to the beams 25 and so no compensation needs to be made for the direction of travel of the vehicle 10. However, in FIG. 1a, the vehicle's direction of travel 202 is not perpendicular to the beams 25. As a result, an offset will be measured even if the vehicle's wheels 21 are all perfectly aligned with the direction of travel 202 of the vehicle 10. By having the two apparatuses A,B take their measurements independently, but substantially simultaneously (although not necessarily precisely simultaneously), on corresponding first and second front wheels on both sides of the vehicle 10 and first and second rear wheels on both sides of the vehicle 10, the control system 8 can determine the direction of travel of the vehicle.

More specifically, the control system 8 can determine the distance to the center of each wheel (e.g. by taking the average of the measurements at the points 30 and 31 on each wheel 21), and can then determine the offset between the centers of the front and rear wheels 21. For example, using the example shown in FIG. 1a, the control system 8 may determine that the distance to the front right wheel center is 1.0 m, the distance to the front left wheel center is 1.6 m, the distance to the rear right wheel center is 1.1 m, and the distance to the rear left wheel center is 1.5 m. Using this information, along with information regarding the front and rear tracks of the vehicle and information regarding the wheelbase of the vehicle, the control system 8 can determine the direction of travel of the vehicle 10 and can then use the determined direction of travel to compensate for the determined offsets and tire wearing angles for the wheels 21. For example, if the front and rear tracks of the vehicle 10 are the same and if the vehicle 10 was traveling perpendicularly to the beams 25, then there would not be any offset in the distances to the front wheels 21 and the rear wheels 21. However, using the example data above, an offset of 0.1 m is apparent. This offset of 0.1 m, when combined with the wheelbase information can be used to determine the angle of the vehicle relative to the beams 25. For example, if the wheelbase of the vehicle 10 is 2.8 m, then the tangent of the angle of the direction of travel 202 of the vehicle 10 is 0.1/2.8 which equals 0.0357, which corresponds to an angle of 2.05 degrees relative to a hypothetical reference line that is perpendicular to the beams 25. This 2.05 degrees can then be subtracted (or added, as appropriate) to the tire wearing angle values determined for the wheels 21 to arrive at the true tire wearing angles for the wheels 21.

The effect of tracking on the second wheel will be the opposite of that on the first wheel so information from the two sides can be compared to determine if there is actually a misalignment problem or whether the effect is all due to wheel tracking. Because the measurements made on the two wheels are independent, there is no need to perfectly align the locations between the two wheels. However, for better consistency of data accumulation, it is preferred that the locations being measured on the two wheels are at least relatively closely aligned. Wheel tracking problems can also arise from differences in suspension or tire inflation between the two wheels. To further improve consistency of data and compensate for tracking issues, distance data from both sides of the vehicle may be averaged, multiple passes of the vehicle past the fixed point may be done to increase the amount of data, and calibration methods may be employed to compensate for uneven driving surfaces.

Using two apparatuses A,B also permits a determination to be made of the wheelbase of the vehicle 10 on each side of the vehicle 10. This in turn permits the control system 8 to determine if the two determinations match each other. If the control system 8 determines that the determinations do not match it means that the wheelbase on one side of the vehicle 10 is not the same as the wheelbase on the other side of the vehicle 10, which can be an indication that the vehicle 10 incurred trauma. If this is found by the control system 8, the control system 8 can notify a user using the output device 8c.

Figure 6A:
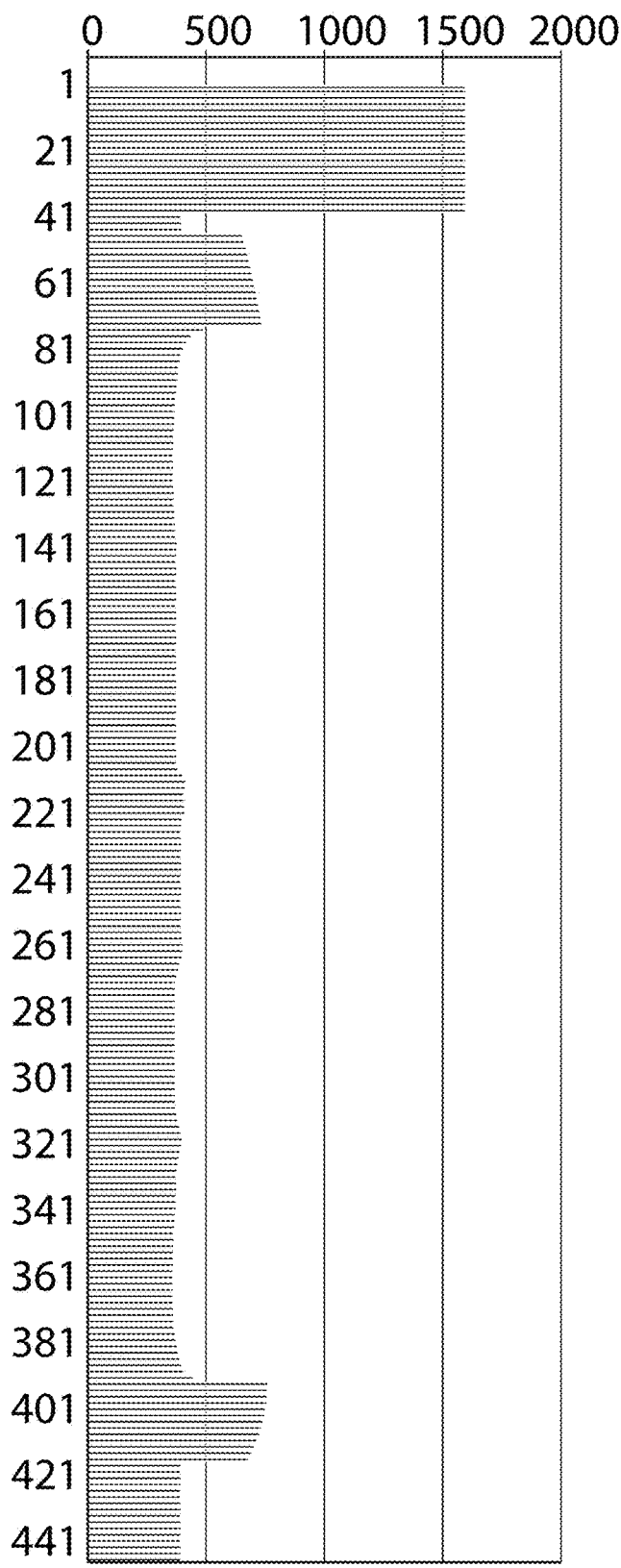
FIG. 6A is a histogram of distance data collected on the front left wheel of an vehicle as the vehicle was driven forward past apparatus A as depicted in FIG. 1.
Figure 6B:
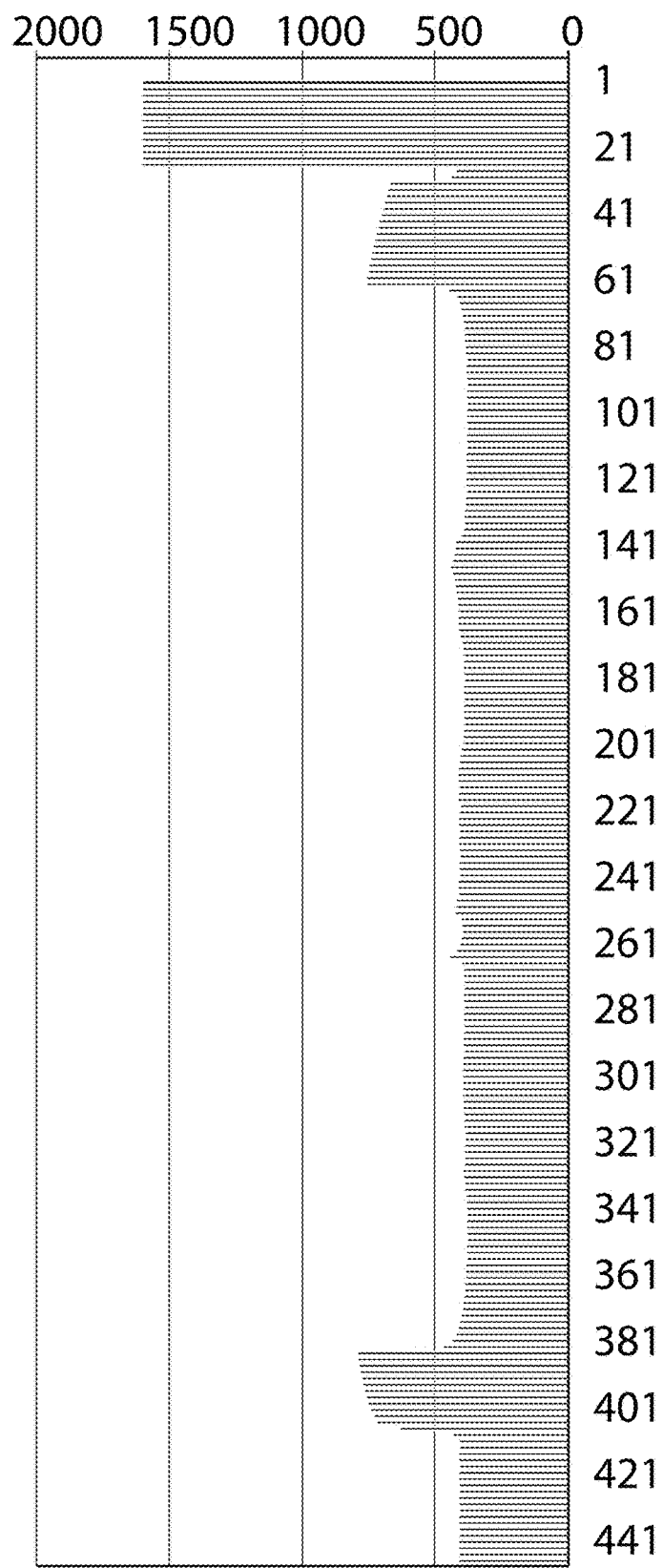
FIG. 6B is a histogram of distance data collected on the front right wheel of an vehicle as the vehicle was driven forward past apparatus B as depicted in FIG. 1.

Data collected on the front wheels of a 2012 Dodge Caravan vehicle using the system described in FIG. 1 are shown in Table 1 and FIGS. 6A and 6B. During operation, the laser displacement sensors are operated continuously, and as the vehicle drives past the lasers data is collected at high frequency. In order to locate which data represent the passage of the wheels rather than the chassis or fender, and then to determine the appropriate data points from which the offset may be calculated, an algorithm was used to average data over 15 samples surrounding each sample point and then to calculate the variance for each sample. Inspection of the average for a local minimum associated with a low variance is an indication of the passage of a wheel. The data is shown on Table 1 for the front wheels. In Table 1, Local Mean is the mean over 15 samples surrounding a sample point and Local Variance is the variance of the sample point from the mean. The Measurement, the Local Mean and the Local Variance for the appropriate data points for each wheel that may be used for offset calculation are shown in bold underline in the table. It is the value of the Measurement at each of these points that is used in the offset calculation.

The data were converted into histograms for easy visual inspection. FIG. 6A is the histogram for the front left wheel and FIG. 6B for the front right wheel. First, it is immediately evident from the histograms that the region between about Points 45 and 416 for the front left (see FIG. 6A) represents the passage of the front left wheel and the region between about Points 30 and 404 for the front right (see FIG. 6B) represents the passage of the front right wheel. The tire profile can be readily seen in these histograms with a generalized minimum between two spikes in distance.

For the front left wheel, with reference to Table 1 and FIG. 6A, it can be seen from the data and histogram that Point 118 forms a minimum distance at the leading part of the wheel. This is most readily seen by looking at the Local Variance surrounding this point. The Local Variances at Points 114-120 around Point 118 are very small when compared to other points in the histogram, with the Local Variance at Point 118 being the smallest. Thus, Point 118 represents the point of maximum bulge on the sidewall of the leading part of the tire on the front left wheel. The value of the Measurement at Point 118 is 360.15 mm. This is the first location for the offset determination. A similar analysis from Table 1 and FIG. 6A for the trailing part of the tire reveals that Point 358 is the point of maximum bulge on the sidewall of the trailing part of the tire on the front left wheel. The value of the Measurement at Point 358 is 358.37 mm. Therefore, the offset for the front left wheel is 360.15-358.37=1.78 mm, which represents a slightly toe-in orientation for the wheel.

Similarly for the front right wheel, with reference to Table 1 and FIG. 6B, it can be seen from the data and histogram that Point 104 forms a minimum distance of 379.65 mm at the leading part of the wheel, while Point 345 forms a minimum distance of 379.35 mm at the trailing part of the wheel. This represents an offset of 0.30 mm, which represents a slightly toe-in orientation of the wheel.

The small offsets for both the left and right front wheels are an indication that the wheels are properly aligned.

TABLE 1

Front Wheels 2012 Dodge Caravan

| | Left | | | Right | | |
|---|---|---|---|---|---|---|
| Point | Measurement (mm) | Local Mean (15 points) | Local Variance (15 Points) | Measurement (mm) | Local Mean (15 points) | Local Variance (15 Points) |
| 1 | 1599.98 | | | 1599.98 | | |
| 2 | 1599.98 | | | 1599.98 | | |
| 3 | 1599.98 | | | 1599.98 | | |
| 4 | 1599.98 | | | 1599.98 | | |
| 5 | 1599.98 | | | 1599.98 | | |
| 6 | 1599.98 | | | 1599.98 | | |
| 7 | 1599.98 | | | 1599.98 | | |
| 8 | 1599.98 | | | 1599.98 | | |
| 9 | 1599.98 | 1599.98 | | 1599.98 | 1599.98 | |
| 10 | 1599.98 | 1599.98 | | 1599.98 | 1599.98 | |
| 11 | 1599.98 | 1599.98 | | 1599.98 | 1599.98 | |
| 12 | 1599.98 | 1599.98 | | 1599.98 | 1599.98 | |
| 13 | 1599.98 | 1599.98 | | 1599.98 | 1599.98 | |
| 14 | 1599.98 | 1599.98 | | 1599.98 | 1599.98 | |
| 15 | 1599.98 | 1599.98 | | 1599.98 | 1599.98 | |
| 16 | 1599.98 | 1599.98 | | 1599.98 | 1599.98 | |
| 17 | 1599.98 | 1599.98 | 0.00 | 1599.98 | 1599.98 | 0.00 |
| 18 | 1599.98 | 1599.98 | 0.00 | 1599.98 | 1599.98 | 0.00 |
| 19 | 1599.98 | 1599.98 | 0.00 | 1599.98 | 1599.98 | 0.00 |
| 20 | 1599.98 | 1599.98 | 0.00 | 1599.98 | 1526.31 | 86837.77 |
| 21 | 1599.98 | 1599.98 | 0.00 | 1599.98 | 1452.71 | 161943.24 |

TABLE 1-continued

| | Front Wheels 2012 Dodge Caravan | | | | | |
|---|---|---|---|---|---|---|
| | Left | | | Right | | |
| Point | Measurement (mm) | Local Mean (15 points) | Local Variance (15 Points) | Measurement (mm) | Local Mean (15 points) | Local Variance (15 Points) |
| 22 | 1599.98 | 1599.98 | 0.00 | 1599.98 | 1379.80 | 224096.67 |
| 23 | 1599.98 | 1599.98 | 0.00 | 1599.98 | 1321.33 | 251319.34 |
| 24 | 1599.98 | 1599.98 | 0.00 | 1599.98 | 1263.20 | 270829.86 |
| 25 | 1599.98 | 1599.98 | 0.00 | 1599.98 | 1205.25 | 282935.89 |
| 26 | 1599.98 | 1599.98 | 0.00 | 1599.98 | 1147.68 | 287485.77 |
| 27 | 1599.98 | 1599.98 | 0.00 | 421.25 | 1090.27 | 284817.39 |
| 28 | 1599.98 | 1599.98 | 0.00 | 422.37 | 1033.13 | 274924.09 |
| 29 | 1599.98 | 1599.98 | 0.00 | 433.37 | 976.31 | 257871.05 |
| 30 | 1599.98 | 1599.98 | 0.00 | 664.60 | 919.60 | 233875.23 |
| 31 | 1599.98 | 1599.98 | 0.00 | 669.90 | 863.18 | 202913.69 |
| 32 | 1599.98 | 1524.66 | 90763.61 | 672.65 | 807.01 | 165106.33 |
| 33 | 1599.98 | 1449.35 | 169414.87 | 678.85 | 751.00 | 120549.83 |
| 34 | 1599.98 | 1374.04 | 235956.02 | 681.55 | 695.13 | 69303.64 |
| 35 | 1599.98 | 1298.70 | 290464.66 | 685.75 | 639.55 | 11441.68 |
| 36 | 1599.98 | 1223.36 | 332852.40 | 690.82 | 657.84 | 8275.59 |
| 37 | 1599.98 | 1148.05 | 363090.12 | 692.62 | 676.27 | 4452.45 |
| 38 | 1599.98 | 1088.39 | 362521.47 | 697.30 | 694.18 | 303.86 |
| 39 | 394.90 | 1029.01 | 354132.08 | 701.17 | 697.82 | 286.24 |
| 40 | 394.98 | 969.99 | 337977.87 | 703.80 | 701.34 | 274.56 |
| 41 | 395.05 | 911.23 | 314248.97 | 706.17 | 704.91 | 259.98 |
| 42 | 394.50 | 852.76 | 283034.14 | 710.70 | 708.16 | 248.14 |
| 43 | 394.60 | 794.55 | 244458.87 | 713.82 | 711.39 | 232.08 |
| 44 | 395.02 | 736.61 | 198615.25 | 717.30 | 714.58 | 220.11 |
| 45 | 645.40 | 678.91 | 145609.21 | 719.92 | 717.65 | 215.49 |
| 46 | 649.87 | 621.49 | 85534.19 | 722.87 | 720.84 | 207.98 |
| 47 | 655.60 | 564.20 | 18459.20 | 726.15 | 723.83 | 200.73 |
| 48 | 659.82 | 582.52 | 17212.90 | 729.77 | 726.55 | 187.76 |
| 49 | 664.55 | 601.05 | 15293.38 | 730.80 | 729.39 | 178.71 |
| 50 | 668.57 | 619.74 | 12668.73 | 733.35 | 732.26 | 168.50 |
| 51 | 673.02 | 638.62 | 9299.65 | 736.70 | 735.02 | 163.19 |
| 52 | 676.80 | 657.79 | 5199.45 | 740.00 | 737.68 | 156.04 |
| 53 | 681.12 | 677.08 | 339.57 | 743.67 | 740.18 | 147.64 |
| 54 | 683.40 | 680.83 | 311.20 | 745.10 | 742.69 | 139.88 |
| 55 | 688.05 | 684.50 | 284.49 | 744.75 | 745.23 | 135.80 |
| 56 | 691.50 | 687.95 | 262.04 | 749.15 | 727.96 | 5612.03 |
| 57 | 694.10 | 691.35 | 243.05 | 752.15 | 709.41 | 11047.94 |
| 58 | 696.57 | 694.64 | 227.84 | 754.77 | 690.22 | 16063.92 |
| 59 | 701.25 | 697.73 | 209.08 | 756.35 | 670.84 | 20288.40 |
| 60 | 703.65 | 700.76 | 196.08 | 757.42 | 650.71 | 23945.87 |
| 61 | 705.42 | 703.71 | 184.39 | 760.05 | 630.05 | 26837.94 |
| 62 | 708.65 | 706.52 | 175.42 | 763.55 | 608.93 | 28855.06 |
| 63 | 710.75 | 709.41 | 166.45 | 449.80 | 587.59 | 29945.02 |
| 64 | 714.25 | 712.09 | 159.43 | 432.92 | 566.35 | 30040.92 |
| 65 | 717.10 | 714.71 | 153.86 | 423.77 | 544.57 | 29135.19 |
| 66 | 718.12 | 717.26 | 145.80 | 423.32 | 522.59 | 27133.72 |
| 67 | 721.45 | 719.79 | 136.56 | 414.55 | 500.38 | 24024.98 |
| 68 | 723.95 | 704.49 | 4486.36 | 409.50 | 478.03 | 19811.52 |
| 69 | 726.12 | 687.30 | 9241.22 | 405.77 | 455.57 | 14497.12 |
| 70 | 729.62 | 669.67 | 13533.61 | 403.55 | 432.76 | 8005.06 |
| 71 | 731.00 | 651.05 | 17536.14 | 404.95 | 409.67 | 240.77 |
| 72 | 733.30 | 631.96 | 20935.83 | 400.77 | 406.20 | 136.43 |
| 73 | 734.90 | 612.13 | 23742.39 | 400.35 | 403.56 | 97.49 |
| 74 | 737.05 | 591.95 | 25739.77 | 399.42 | 401.45 | 77.77 |
| 75 | 456.47 | 571.46 | 26944.83 | 398.85 | 399.36 | 50.23 |
| 76 | 428.72 | 550.81 | 27157.28 | 397.92 | 397.72 | 40.03 |
| 77 | 423.32 | 529.61 | 26519.47 | 395.12 | 396.36 | 35.44 |
| 78 | 410.62 | 508.14 | 24893.24 | 394.22 | 395.17 | 34.28 |
| 79 | 405.30 | 486.37 | 22190.52 | 394.25 | 394.08 | 33.80 |
| 80 | 397.10 | 464.47 | 18434.35 | 390.67 | 392.78 | 30.57 |
| 81 | 394.20 | 442.38 | 13573.40 | 390.00 | 391.71 | 30.77 |
| 82 | 390.17 | 420.13 | 7609.76 | 389.82 | 390.63 | 29.54 |
| 83 | 391.17 | 397.67 | 496.17 | 388.37 | 389.57 | 27.64 |
| 84 | 384.67 | 392.63 | 270.07 | 387.75 | 388.52 | 24.39 |
| 85 | 382.65 | 389.27 | 192.14 | 386.67 | 387.49 | 20.73 |
| 86 | 381.27 | 386.20 | 119.85 | 386.10 | 386.64 | 18.44 |
| 87 | 380.67 | 383.78 | 87.50 | 384.25 | 385.80 | 16.20 |
| 88 | 379.85 | 381.61 | 63.35 | 383.55 | 384.94 | 12.52 |
| 89 | 378.87 | 379.97 | 52.16 | 383.05 | 384.28 | 11.41 |
| 90 | 377.60 | 378.43 | 43.22 | 382.45 | 383.63 | 10.21 |
| 91 | 375.95 | 377.00 | 40.23 | 382.15 | 383.01 | 8.18 |
| 92 | 374.90 | 375.54 | 30.17 | 381.42 | 382.48 | 6.61 |
| 93 | 374.25 | 374.30 | 30.73 | 381.55 | 381.99 | 4.95 |
| 94 | 371.90 | 373.18 | 30.80 | 380.70 | 381.57 | 3.59 |

TABLE 1-continued

| | Front Wheels 2012 Dodge Caravan | | | | | |
|---|---|---|---|---|---|---|
| | Left | | | Right | | |
| Point | Measurement (mm) | Local Mean (15 points) | Local Variance (15 Points) | Measurement (mm) | Local Mean (15 points) | Local Variance (15 Points) |
| 95 | 370.50 | 372.14 | 30.08 | 380.50 | 381.16 | 2.32 |
| 96 | 370.87 | 371.09 | 28.63 | 380.12 | 380.87 | 1.75 |
| 97 | 369.67 | 370.04 | 26.75 | 379.65 | 380.62 | 1.31 |
| 98 | 367.22 | 369.03 | 24.03 | 379.90 | 380.41 | 0.93 |
| 99 | 367.85 | 368.07 | 21.26 | 379.90 | 380.23 | 0.66 |
| 100 | 364.75 | 367.19 | 18.85 | 379.90 | 380.07 | 0.42 |
| 101 | 364.77 | 366.33 | 16.49 | 379.90 | 379.95 | 0.30 |
| 102 | 364.70 | 365.51 | 13.41 | 379.50 | 379.83 | 0.12 |
| 103 | 363.87 | 364.80 | 11.76 | 379.60 | 379.76 | 0.07 |
| 104 | 362.95 | 364.18 | 10.36 | 379.65 | 379.74 | 0.04 |
| 105 | 362.72 | 363.53 | 7.86 | 379.64 | 379.79 | 0.14 |
| 106 | 362.20 | 362.96 | 5.64 | 379.62 | 379.92 | 0.35 |
| 107 | 361.87 | 362.53 | 4.68 | 379.56 | 380.08 | 0.77 |
| 108 | 361.20 | 362.05 | 2.90 | 379.50 | 380.30 | 1.44 |
| 109 | 361.10 | 361.76 | 2.56 | 379.70 | 380.56 | 2.30 |
| 110 | 360.60 | 361.48 | 2.03 | 379.55 | 380.88 | 3.48 |
| 111 | 360.62 | 361.19 | 1.37 | 380.15 | 381.30 | 5.02 |
| 112 | 360.45 | 360.97 | 0.90 | 381.00 | 381.77 | 6.91 |
| 113 | 360.42 | 360.81 | 0.63 | 381.65 | 382.29 | 8.92 |
| 114 | 360.35 | 360.65 | 0.39 | 382.52 | 382.89 | 11.29 |
| 115 | 360.22 | 360.53 | 0.23 | 383.37 | 383.57 | 13.90 |
| 116 | 360.20 | 360.42 | 0.10 | 384.07 | 384.33 | 16.66 |
| 117 | 360.20 | 360.36 | 0.06 | 385.00 | 385.16 | 19.10 |
| 118 | 360.15 | 360.33 | 0.03 | 386.15 | 386.07 | 21.76 |
| 119 | 360.32 | 360.38 | 0.10 | 387.20 | 387.09 | 24.15 |
| 120 | 360.32 | 360.47 | 0.29 | 388.02 | 387.76 | 21.41 |
| 121 | 360.20 | 360.63 | 0.66 | 389.25 | 388.35 | 18.50 |
| 122 | 360.20 | 360.84 | 1.27 | 390.45 | 388.90 | 15.45 |
| 123 | 360.22 | 361.10 | 2.08 | 391.75 | 389.41 | 12.68 |
| 124 | 360.12 | 361.44 | 3.32 | 392.75 | 389.88 | 10.16 |
| 125 | 360.70 | 361.85 | 4.92 | 394.27 | 390.36 | 7.91 |
| 126 | 361.40 | 362.31 | 6.73 | 395.82 | 390.83 | 6.07 |
| 127 | 362.10 | 362.83 | 8.60 | 390.85 | 391.28 | 4.82 |
| 128 | 362.92 | 363.40 | 10.73 | 390.52 | 391.71 | 4.01 |
| 129 | 363.77 | 364.04 | 13.16 | 390.35 | 392.17 | 3.84 |
| 130 | 364.52 | 364.82 | 16.52 | 390.70 | 393.07 | 11.11 |
| 131 | 365.70 | 365.67 | 19.61 | 390.87 | 394.29 | 28.00 |
| 132 | 366.75 | 366.61 | 22.75 | 391.82 | 396.52 | 95.66 |
| 133 | 367.62 | 367.53 | 23.58 | 392.50 | 398.91 | 168.08 |
| 134 | 368.40 | 368.13 | 20.63 | 393.37 | 401.07 | 221.30 |
| 135 | 369.42 | 368.70 | 17.64 | 394.00 | 403.09 | 263.48 |
| 136 | 370.65 | 369.24 | 14.70 | 395.52 | 405.41 | 289.43 |
| 137 | 372.70 | 369.74 | 11.96 | 403.60 | 408.02 | 315.15 |
| 138 | 373.72 | 370.17 | 9.44 | 409.92 | 411.10 | 351.19 |
| 139 | 375.20 | 370.56 | 7.17 | 427.47 | 414.26 | 373.39 |
| 140 | 374.85 | 370.84 | 5.52 | 431.05 | 417.64 | 387.51 |
| 141 | 370.40 | 371.06 | 4.37 | 428.82 | 420.41 | 357.65 |
| 142 | 370.50 | 371.22 | 3.60 | 428.00 | 422.78 | 306.41 |
| 143 | 370.77 | 371.32 | 3.16 | 428.10 | 424.89 | 245.25 |
| 144 | 370.92 | 371.36 | 3.04 | 432.17 | 426.82 | 177.67 |
| 145 | 370.65 | 371.26 | 3.32 | 439.72 | 428.73 | 108.53 |
| 146 | 370.70 | 371.07 | 3.33 | 441.25 | 429.98 | 66.41 |
| 147 | 370.20 | 370.79 | 2.98 | 444.95 | 430.70 | 43.92 |
| 148 | 370.23 | 370.41 | 1.72 | 436.12 | 430.18 | 51.90 |
| 149 | 370.25 | 370.10 | 0.32 | 430.42 | 429.35 | 61.26 |
| 150 | 370.00 | 370.13 | 0.35 | 427.10 | 428.61 | 70.91 |
| 151 | 369.95 | 370.15 | 0.37 | 424.87 | 427.89 | 80.32 |
| 152 | 369.15 | 370.15 | 0.38 | 426.05 | 427.15 | 88.58 |
| 153 | 369.62 | 370.10 | 0.34 | 423.73 | 426.14 | 94.24 |
| 154 | 369.32 | 370.15 | 0.46 | 421.42 | 424.63 | 86.97 |
| 155 | 369.12 | 370.14 | 0.44 | 419.10 | 423.02 | 71.29 |
| 156 | 369.90 | 370.07 | 0.51 | 417.85 | 421.16 | 39.65 |
| 157 | 370.80 | 369.99 | 0.58 | 416.95 | 419.82 | 25.52 |
| 158 | 370.77 | 369.91 | 0.64 | 416.37 | 418.84 | 18.78 |
| 159 | 370.90 | 369.84 | 0.70 | 416.37 | 417.98 | 15.42 |
| 160 | 370.00 | 369.81 | 0.70 | 415.90 | 417.11 | 14.75 |
| 161 | 371.55 | 369.84 | 0.67 | 415.55 | 415.55 | 23.88 |
| 162 | 370.42 | 369.84 | 0.67 | 415.55 | 414.03 | 34.41 |
| 163 | 369.10 | 369.89 | 0.66 | 415.15 | 412.60 | 44.72 |
| 164 | 368.95 | 369.94 | 0.61 | 414.80 | 411.22 | 55.90 |
| 165 | 368.95 | 369.97 | 0.62 | 414.65 | 409.85 | 66.70 |
| 166 | 368.95 | 369.94 | 0.59 | 413.40 | 408.47 | 76.21 |
| 167 | 369.52 | 369.92 | 0.55 | 410.95 | 407.09 | 83.49 |

TABLE 1-continued

Front Wheels 2012 Dodge Caravan

| | Left | | | Right | | |
|---|---|---|---|---|---|---|
| Point | Measurement (mm) | Local Mean (15 points) | Local Variance (15 Points) | Measurement (mm) | Local Mean (15 points) | Local Variance (15 Points) |
| 168 | 369.65 | 369.88 | 0.50 | 401.12 | 405.67 | 87.51 |
| 169 | 369.62 | 369.92 | 0.53 | 399.37 | 404.24 | 89.06 |
| 170 | 370.05 | 369.97 | 0.48 | 398.47 | 400.50 | 71.93 |
| 171 | 369.95 | 370.13 | 0.50 | 397.10 | 399.01 | 59.56 |
| 172 | 370.30 | 370.28 | 0.46 | 395.85 | 397.53 | 42.77 |
| 173 | 370.40 | 370.43 | 0.37 | 394.90 | 396.17 | 24.25 |
| 174 | 370.40 | 370.57 | 0.40 | 394.25 | 394.97 | 7.84 |
| 175 | 370.30 | 370.73 | 0.46 | 393.72 | 394.42 | 5.13 |
| 176 | 370.60 | 370.91 | 0.53 | 393.00 | 393.99 | 3.35 |
| 177 | 370.70 | 371.07 | 0.60 | 393.47 | 393.64 | 1.84 |
| 178 | 371.25 | 371.22 | 0.60 | 392.40 | 393.37 | 0.92 |
| 179 | 371.25 | 371.35 | 0.60 | 392.45 | 393.19 | 0.45 |
| 180 | 371.25 | 371.50 | 0.63 | 392.50 | 393.08 | 0.23 |
| 181 | 371.17 | 371.66 | 0.61 | 393.02 | 392.98 | 0.13 |
| 182 | 371.65 | 371.81 | 0.53 | 393.00 | 392.96 | 0.11 |
| 183 | 372.00 | 371.96 | 0.48 | 392.85 | 392.97 | 0.11 |
| 184 | 372.40 | 372.11 | 0.40 | 392.90 | 392.95 | 0.09 |
| 185 | 372.36 | 372.24 | 0.41 | 393.17 | 393.00 | 0.07 |
| 186 | 372.32 | 372.37 | 0.39 | 393.14 | 393.05 | 0.05 |
| 187 | 372.25 | 372.48 | 0.31 | 393.14 | 393.08 | 0.03 |
| 188 | 372.67 | 372.60 | 0.19 | 393.15 | 393.11 | 0.05 |
| 189 | 372.66 | 372.69 | 0.13 | 392.77 | 393.13 | 0.04 |
| 190 | 372.65 | 372.77 | 0.10 | 393.45 | 393.14 | 0.04 |
| 191 | 372.85 | 372.83 | 0.11 | 393.12 | 393.14 | 0.04 |
| 192 | 372.90 | 372.90 | 0.12 | 393.22 | 393.43 | 1.29 |
| 193 | 373.17 | 373.00 | 0.13 | 393.15 | 394.02 | 6.22 |
| 194 | 373.20 | 373.06 | 0.09 | 393.15 | 394.86 | 15.26 |
| 195 | 372.92 | 373.11 | 0.10 | 392.90 | 395.89 | 27.30 |
| 196 | 373.02 | 373.19 | 0.10 | 393.57 | 397.10 | 41.27 |
| 197 | 373.02 | 373.26 | 0.10 | 393.20 | 398.43 | 57.44 |
| 198 | 373.14 | 373.33 | 0.11 | 393.06 | 399.97 | 75.47 |
| 199 | 373.25 | 373.37 | 0.10 | 392.92 | 401.62 | 92.43 |
| 200 | 373.52 | 373.47 | 0.21 | 397.47 | 403.20 | 100.99 |
| 201 | 373.72 | 374.54 | 16.70 | 402.05 | 404.75 | 103.65 |
| 202 | 373.15 | 376.76 | 82.85 | 405.77 | 406.29 | 100.13 |
| 203 | 373.55 | 379.17 | 151.11 | 408.55 | 407.75 | 92.34 |
| 204 | 373.72 | 381.63 | 209.37 | 410.97 | 409.23 | 79.06 |
| 205 | 373.79 | 384.13 | 257.73 | 413.42 | 410.69 | 60.42 |
| 206 | 373.85 | 386.54 | 288.65 | 416.22 | 412.14 | 36.78 |
| 207 | 373.50 | 388.64 | 295.96 | 417.97 | 413.22 | 20.32 |
| 208 | 374.70 | 390.68 | 293.27 | 416.75 | 414.02 | 10.77 |
| 209 | 389.22 | 392.85 | 282.48 | 416.40 | 414.71 | 5.72 |
| 210 | 406.20 | 395.35 | 272.71 | 416.00 | 414.62 | 7.03 |
| 211 | 409.27 | 397.74 | 247.61 | 415.50 | 414.72 | 6.40 |
| 212 | 409.90 | 400.11 | 210.19 | 415.40 | 414.63 | 6.82 |
| 213 | 410.67 | 402.32 | 159.14 | 414.92 | 414.33 | 7.13 |
| 214 | 409.40 | 403.93 | 98.67 | 414.77 | 413.91 | 6.48 |
| 215 | 404.92 | 405.32 | 40.63 | 413.57 | 413.55 | 6.23 |
| 216 | 404.37 | 405.70 | 29.62 | 414.10 | 413.19 | 6.01 |
| 217 | 405.75 | 404.90 | 38.33 | 416.17 | 412.86 | 5.63 |
| 218 | 411.00 | 403.90 | 43.89 | 407.20 | 412.54 | 5.37 |
| 219 | 409.57 | 402.82 | 47.51 | 412.47 | 412.23 | 4.90 |
| 220 | 409.32 | 401.66 | 48.28 | 411.95 | 411.94 | 4.52 |
| 221 | 407.07 | 400.57 | 47.94 | 411.75 | 411.64 | 4.04 |
| 222 | 397.55 | 399.78 | 49.96 | 411.75 | 411.37 | 4.00 |
| 223 | 395.52 | 399.01 | 51.34 | 411.35 | 411.07 | 3.61 |
| 224 | 394.97 | 398.08 | 50.86 | 410.92 | 410.73 | 1.62 |
| 225 | 394.22 | 396.71 | 41.04 | 411.12 | 410.97 | 0.67 |
| 226 | 394.32 | 395.49 | 29.73 | 410.65 | 410.89 | 0.51 |
| 227 | 393.70 | 394.26 | 16.00 | 410.80 | 410.85 | 0.44 |
| 228 | 393.20 | 393.17 | 3.91 | 410.47 | 410.83 | 0.41 |
| 229 | 393.13 | 392.70 | 2.82 | 410.30 | 410.81 | 0.38 |
| 230 | 393.05 | 392.35 | 2.55 | 409.57 | 410.83 | 0.40 |
| 231 | 392.75 | 392.05 | 2.23 | 409.55 | 410.87 | 0.44 |
| 232 | 391.82 | 391.79 | 2.02 | 411.05 | 411.11 | 1.39 |
| 233 | 390.50 | 391.52 | 1.64 | 410.90 | 411.29 | 1.74 |
| 234 | 391.30 | 391.28 | 1.38 | 411.25 | 411.46 | 1.98 |
| 235 | 390.85 | 391.08 | 1.16 | 411.33 | 411.70 | 2.33 |
| 236 | 390.70 | 390.92 | 0.85 | 411.40 | 411.98 | 2.65 |
| 237 | 390.50 | 390.76 | 0.50 | 411.52 | 412.33 | 2.68 |
| 238 | 390.25 | 390.60 | 0.20 | 411.56 | 412.73 | 2.75 |
| 239 | 390.40 | 390.53 | 0.09 | 411.60 | 413.20 | 4.35 |
| 240 | 390.35 | 390.53 | 0.09 | 414.65 | 413.91 | 8.37 |

TABLE 1-continued

| | Front Wheels 2012 Dodge Caravan | | | | | |
|---|---|---|---|---|---|---|
| | Left | | | Right | | |
| Point | Measurement (mm) | Local Mean (15 points) | Local Variance (15 Points) | Measurement (mm) | Local Mean (15 points) | Local Variance (15 Points) |
| 241 | 390.32 | 390.52 | 0.08 | 413.47 | 414.83 | 15.71 |
| 242 | 390.15 | 390.53 | 0.09 | 413.30 | 415.66 | 19.90 |
| 243 | 390.15 | 390.62 | 0.22 | 414.05 | 416.44 | 21.86 |
| 244 | 390.67 | 390.76 | 0.51 | 414.45 | 416.00 | 29.40 |
| 245 | 390.62 | 391.02 | 1.18 | 414.82 | 415.49 | 38.17 |
| 246 | 390.40 | 391.20 | 1.43 | 415.67 | 414.96 | 46.63 |
| 247 | 390.80 | 391.41 | 1.72 | 418.07 | 414.23 | 55.19 |
| 248 | 390.50 | 391.63 | 1.96 | 421.52 | 413.56 | 62.97 |
| 249 | 391.15 | 391.90 | 2.17 | 424.97 | 412.92 | 69.41 |
| 250 | 391.05 | 392.19 | 2.37 | 423.85 | 412.27 | 74.23 |
| 251 | 391.95 | 392.50 | 2.81 | 423.05 | 411.63 | 77.39 |
| 252 | 392.70 | 392.85 | 3.22 | 404.92 | 411.07 | 78.32 |
| 253 | 394.02 | 393.22 | 3.33 | 403.90 | 411.61 | 88.02 |
| 254 | 393.10 | 393.62 | 3.63 | 403.75 | 412.04 | 96.89 |
| 255 | 393.52 | 394.15 | 4.27 | 403.65 | 413.66 | 169.29 |
| 256 | 393.72 | 394.37 | 3.59 | 403.45 | 415.03 | 230.55 |
| 257 | 394.12 | 394.48 | 2.98 | 403.75 | 413.63 | 233.55 |
| 258 | 394.57 | 394.35 | 3.96 | 404.25 | 411.59 | 254.74 |
| 259 | 395.35 | 393.97 | 7.47 | 404.85 | 410.77 | 276.47 |
| 260 | 395.85 | 393.25 | 15.12 | 406.35 | 409.98 | 297.47 |
| 261 | 395.95 | 392.33 | 28.12 | 423.77 | 409.20 | 316.99 |
| 262 | 396.75 | 391.11 | 47.38 | 424.60 | 408.43 | 335.12 |
| 263 | 398.40 | 389.70 | 69.44 | 445.85 | 407.67 | 351.85 |
| 264 | 394.50 | 388.26 | 86.71 | 445.50 | 406.90 | 367.50 |
| 265 | 392.72 | 386.79 | 99.36 | 402.82 | 406.08 | 382.01 |
| 266 | 389.97 | 385.29 | 105.59 | 392.47 | 405.23 | 395.19 |
| 267 | 387.00 | 383.75 | 106.39 | 392.65 | 404.28 | 406.44 |
| 268 | 383.25 | 382.19 | 101.93 | 392.05 | 402.12 | 386.17 |
| 269 | 379.30 | 380.56 | 90.94 | 392.06 | 399.94 | 352.54 |
| 270 | 375.20 | 378.82 | 69.93 | 392.07 | 396.32 | 192.89 |
| 271 | 372.52 | 377.34 | 53.08 | 392.07 | 392.71 | 7.95 |
| 272 | 372.60 | 375.97 | 36.02 | 392.07 | 392.01 | 0.13 |
| 273 | 372.47 | 374.79 | 21.51 | 392.06 | 391.99 | 0.12 |
| 274 | 372.85 | 373.84 | 10.20 | 392.05 | 391.98 | 0.11 |
| 275 | 372.70 | 373.13 | 3.44 | 392.10 | 392.06 | 0.19 |
| 276 | 372.67 | 372.87 | 1.02 | 391.40 | 392.13 | 0.28 |
| 277 | 372.30 | 372.45 | 1.51 | 391.82 | 392.23 | 0.42 |
| 278 | 372.22 | 372.30 | 1.86 | 391.62 | 392.36 | 0.64 |
| 279 | 372.26 | 372.23 | 1.88 | 391.30 | 392.52 | 0.89 |
| 280 | 372.26 | 372.13 | 1.98 | 392.40 | 392.68 | 1.13 |
| 281 | 372.25 | 372.01 | 2.01 | 392.20 | 392.86 | 1.38 |
| 282 | 372.70 | 371.88 | 2.08 | 392.50 | 393.06 | 1.66 |
| 283 | 372.62 | 371.77 | 2.08 | 393.12 | 393.31 | 1.70 |
| 284 | 375.40 | 371.69 | 2.08 | 393.17 | 393.57 | 1.89 |
| 285 | 369.00 | 371.58 | 2.14 | 393.60 | 393.89 | 2.07 |
| 286 | 370.17 | 371.45 | 2.19 | 394.05 | 394.23 | 1.91 |
| 287 | 371.60 | 371.32 | 2.22 | 394.37 | 394.52 | 2.05 |
| 288 | 370.95 | 371.19 | 2.21 | 394.52 | 394.84 | 2.00 |
| 289 | 371.10 | 371.03 | 2.08 | 394.77 | 395.15 | 1.87 |
| 290 | 370.70 | 370.87 | 1.92 | 395.10 | 395.44 | 1.86 |
| 291 | 371.00 | 370.49 | 0.41 | 395.15 | 395.73 | 1.71 |
| 292 | 371.10 | 370.54 | 0.29 | 395.75 | 396.00 | 1.57 |
| 293 | 370.55 | 370.51 | 0.32 | 396.37 | 396.24 | 1.43 |
| 294 | 370.42 | 370.36 | 0.31 | 396.37 | 396.46 | 1.28 |
| 295 | 370.30 | 370.26 | 0.34 | 396.80 | 396.66 | 1.04 |
| 296 | 370.30 | 370.10 | 0.43 | 397.02 | 396.84 | 0.81 |
| 297 | 370.28 | 369.96 | 0.54 | 397.10 | 396.98 | 0.58 |
| 298 | 370.25 | 369.80 | 0.58 | 397.45 | 397.10 | 0.32 |
| 299 | 369.65 | 369.65 | 0.50 | 397.50 | 397.14 | 0.23 |
| 300 | 369.70 | 369.60 | 0.45 | 397.65 | 397.13 | 0.25 |
| 301 | 369.80 | 369.55 | 0.40 | 397.65 | 397.06 | 0.43 |
| 302 | 369.32 | 369.62 | 0.58 | 397.65 | 396.91 | 0.84 |
| 303 | 369.45 | 369.86 | 1.82 | 397.50 | 396.69 | 1.55 |
| 304 | 368.70 | 370.17 | 3.54 | 397.52 | 396.43 | 2.32 |
| 305 | 368.63 | 370.55 | 5.74 | 397.17 | 396.12 | 3.07 |
| 306 | 368.55 | 371.16 | 10.06 | 396.95 | 395.75 | 4.07 |
| 307 | 368.80 | 371.98 | 17.66 | 396.40 | 395.29 | 5.29 |
| 308 | 369.87 | 373.02 | 29.06 | 396.20 | 394.71 | 7.48 |
| 309 | 369.70 | 374.33 | 44.36 | 395.35 | 394.06 | 9.72 |
| 310 | 371.32 | 375.85 | 62.93 | 394.57 | 393.55 | 9.83 |
| 311 | 373.95 | 377.69 | 85.73 | 393.65 | 393.04 | 9.43 |
| 312 | 374.94 | 379.59 | 102.91 | 393.24 | 392.57 | 8.59 |
| 313 | 375.92 | 381.37 | 108.24 | 392.82 | 392.12 | 7.37 |

TABLE 1-continued

| | Front Wheels 2012 Dodge Caravan | | | | | |
|---|---|---|---|---|---|---|
| | Left | | | Right | | |
| Point | Measurement (mm) | Local Mean (15 points) | Local Variance (15 Points) | Measurement (mm) | Local Mean (15 points) | Local Variance (15 Points) |
| 314 | 378.72 | 382.94 | 103.10 | 391.87 | 391.72 | 6.10 |
| 315 | 382.05 | 384.29 | 92.54 | 390.87 | 391.36 | 4.59 |
| 316 | 385.42 | 385.45 | 76.48 | 388.87 | 391.06 | 3.38 |
| 317 | 388.95 | 386.34 | 61.41 | 387.90 | 390.79 | 2.44 |
| 318 | 392.17 | 386.93 | 50.95 | 389.90 | 390.57 | 1.82 |
| 319 | 396.37 | 387.34 | 43.01 | 389.80 | 390.74 | 3.31 |
| 320 | 397.10 | 387.50 | 39.51 | 390.10 | 390.83 | 3.79 |
| 321 | 395.20 | 387.32 | 43.30 | 390.30 | 390.85 | 3.86 |
| 322 | 392.47 | 386.80 | 53.19 | 390.42 | 390.85 | 3.86 |
| 323 | 390.02 | 385.96 | 66.30 | 390.75 | 390.89 | 3.72 |
| 324 | 387.17 | 384.83 | 78.17 | 390.87 | 390.89 | 3.69 |
| 325 | 384.67 | 383.41 | 86.12 | 390.50 | 390.68 | 4.81 |
| 326 | 382.82 | 381.66 | 83.40 | 390.30 | 390.38 | 6.73 |
| 327 | 381.00 | 379.82 | 73.23 | 395.90 | 389.99 | 9.24 |
| 328 | 378.30 | 378.10 | 61.06 | 394.07 | 389.52 | 12.25 |
| 329 | 376.07 | 376.53 | 49.63 | 392.27 | 388.97 | 15.68 |
| 330 | 374.27 | 375.19 | 37.83 | 390.80 | 388.34 | 19.37 |
| 331 | 372.80 | 374.34 | 26.85 | 389.45 | 387.64 | 22.83 |
| 332 | 372.02 | 373.53 | 18.77 | 387.97 | 386.90 | 26.46 |
| 333 | 370.85 | 372.70 | 12.54 | 386.72 | 386.19 | 28.93 |
| 334 | 370.15 | 371.93 | 7.76 | 385.30 | 385.10 | 24.11 |
| 335 | 369.55 | 371.26 | 5.34 | 384.25 | 384.13 | 19.58 |
| 336 | 369.30 | 370.60 | 5.09 | 383.25 | 383.28 | 15.58 |
| 337 | 368.97 | 369.99 | 5.87 | 382.22 | 382.51 | 12.01 |
| 338 | 369.92 | 369.44 | 7.16 | 381.17 | 381.84 | 8.78 |
| 339 | 374.42 | 368.86 | 8.96 | 380.45 | 381.26 | 6.24 |
| 340 | 372.47 | 368.29 | 11.42 | 379.45 | 380.76 | 4.12 |
| 341 | 370.47 | 367.70 | 14.27 | 379.57 | 380.37 | 2.62 |
| 342 | 369.42 | 367.07 | 17.68 | 379.50 | 380.06 | 1.48 |
| 343 | 368.27 | 366.42 | 20.91 | 379.51 | 379.81 | 0.70 |
| 344 | 366.15 | 365.72 | 24.46 | 379.52 | 379.66 | 0.27 |
| 345 | 365.12 | 364.95 | 26.40 | 379.35 | 379.60 | 0.12 |
| 346 | 364.47 | 363.88 | 21.96 | 379.42 | 379.61 | 0.14 |
| 347 | 363.37 | 362.93 | 17.97 | 379.15 | 379.73 | 0.32 |
| 348 | 362.27 | 362.12 | 14.73 | 379.30 | 379.89 | 0.64 |
| 349 | 361.32 | 361.38 | 11.33 | 379.40 | 380.07 | 0.98 |
| 350 | 360.15 | 360.72 | 8.13 | 379.60 | 380.32 | 1.62 |
| 351 | 359.55 | 360.20 | 6.13 | 379.55 | 380.61 | 2.42 |
| 352 | 358.45 | 359.75 | 4.43 | 379.95 | 380.99 | 3.59 |
| 353 | 358.40 | 359.35 | 2.79 | 380.25 | 381.45 | 5.20 |
| 354 | 358.25 | 359.03 | 1.57 | 380.60 | 382.02 | 7.26 |
| 355 | 358.28 | 358.78 | 0.77 | 381.25 | 382.66 | 9.67 |
| 356 | 358.30 | 358.60 | 0.28 | 381.95 | 383.34 | 11.76 |
| 357 | 358.40 | 358.54 | 0.13 | 382.20 | 384.03 | 13.42 |
| 358 | 358.37 | 358.50 | 0.07 | 383.25 | 384.98 | 17.92 |
| 359 | 358.36 | 358.58 | 0.15 | 383.95 | 385.91 | 20.86 |
| 360 | 358.35 | 358.73 | 0.45 | 385.10 | 386.97 | 24.72 |
| 361 | 358.45 | 358.88 | 0.63 | 386.30 | 388.03 | 27.11 |
| 362 | 358.55 | 359.12 | 1.16 | 387.70 | 389.14 | 29.47 |
| 363 | 358.58 | 359.42 | 2.02 | 388.90 | 390.37 | 33.32 |
| 364 | 358.60 | 359.76 | 3.04 | 389.50 | 391.65 | 35.34 |
| 365 | 359.20 | 360.15 | 4.12 | 390.00 | 392.94 | 37.23 |
| 366 | 358.95 | 360.59 | 5.29 | 393.87 | 394.35 | 39.73 |
| 367 | 359.60 | 361.18 | 7.79 | 393.90 | 395.95 | 46.52 |
| 368 | 360.72 | 361.84 | 10.42 | 396.05 | 397.81 | 59.89 |
| 369 | 360.50 | 362.54 | 12.85 | 396.50 | 399.93 | 81.30 |
| 370 | 361.82 | 363.44 | 17.32 | 397.90 | 402.58 | 124.22 |
| 371 | 362.87 | 364.37 | 20.61 | 400.47 | 406.20 | 219.06 |
| 372 | 363.55 | 365.36 | 24.31 | 401.30 | 410.49 | 346.37 |
| 373 | 364.15 | 366.44 | 26.98 | 402.70 | 437.21 | 10106.87 |
| 374 | 364.90 | 367.55 | 29.20 | 405.00 | 463.76 | 18218.73 |
| 375 | 367.32 | 368.75 | 33.32 | 409.15 | 489.94 | 24701.75 |
| 376 | 368.30 | 369.98 | 34.30 | 414.17 | 515.95 | 29640.19 |
| 377 | 369.07 | 371.29 | 37.13 | 419.47 | 541.85 | 33150.41 |
| 378 | 372.05 | 372.77 | 43.20 | 428.70 | 567.49 | 35241.41 |
| 379 | 372.52 | 375.11 | 79.45 | 443.75 | 592.92 | 35885.63 |
| 380 | 374.02 | 377.47 | 107.23 | 454.37 | 617.93 | 35075.40 |
| 381 | 375.15 | 379.82 | 126.78 | 794.72 | 642.61 | 32949.33 |
| 382 | 376.25 | 382.72 | 175.27 | 792.20 | 666.88 | 29644.13 |
| 383 | 378.77 | 386.56 | 277.82 | 788.77 | 690.68 | 25252.83 |
| 384 | 378.97 | 401.48 | 3057.55 | 786.62 | 713.93 | 19848.29 |
| 385 | 381.47 | 427.33 | 11451.81 | 786.40 | 736.29 | 13681.64 |
| 386 | 385.02 | 453.09 | 18383.57 | 785.00 | 757.44 | 7133.20 |

TABLE 1-continued

Front Wheels 2012 Dodge Caravan

| | Left | | | Right | | |
|---|---|---|---|---|---|---|
| Point | Measurement (mm) | Local Mean (15 points) | Local Variance (15 Points) | Measurement (mm) | Local Mean (15 points) | Local Variance (15 Points) |
| 387 | 398.75 | 478.60 | 23818.51 | 782.75 | 777.68 | 133.51 |
| 388 | 399.45 | 503.84 | 27780.10 | 777.92 | 775.07 | 140.30 |
| 389 | 400.15 | 528.82 | 30310.50 | 775.12 | 772.38 | 150.25 |
| 390 | 410.82 | 553.41 | 31473.51 | 773.25 | 769.59 | 168.92 |
| 391 | 425.90 | 577.87 | 31306.11 | 771.20 | 766.70 | 188.80 |
| 392 | 592.86 | 601.97 | 29875.20 | 768.12 | 763.66 | 199.18 |
| 392 | 759.82 | 625.64 | 27275.29 | 764.15 | 760.38 | 210.37 |
| 394 | 759.00 | 648.23 | 23946.50 | 761.05 | 756.90 | 225.40 |
| 395 | 756.57 | 670.50 | 19513.99 | 757.92 | 753.46 | 247.62 |
| 396 | 753.77 | 692.67 | 14043.16 | 755.60 | 749.84 | 276.18 |
| 397 | 750.95 | 713.81 | 7979.00 | 751.80 | 745.90 | 311.86 |
| 398 | 747.60 | 733.78 | 1640.50 | 746.95 | 732.47 | 2287.94 |
| 399 | 745.92 | 742.35 | 154.53 | 743.25 | 709.07 | 8710.35 |
| 400 | 742.95 | 739.51 | 169.16 | 740.77 | 685.91 | 14022.79 |
| 401 | 740.07 | 736.54 | 177.35 | 735.85 | 662.95 | 18234.57 |
| 402 | 737.57 | 733.37 | 191.65 | 730.50 | 640.20 | 21370.56 |
| 403 | 733.52 | 730.18 | 205.04 | 726.40 | 617.60 | 23442.45 |
| 404 | 732.70 | 726.88 | 221.51 | 720.82 | 595.26 | 24505.47 |
| 405 | 727.95 | 723.40 | 248.66 | 714.05 | 573.20 | 24632.74 |
| 406 | 725.47 | 719.70 | 275.75 | 569.80 | 551.39 | 23820.49 |
| 407 | 721.32 | 715.83 | 307.33 | 417.20 | 529.72 | 22069.86 |
| 408 | 717.22 | 711.77 | 343.55 | 416.75 | 508.38 | 19475.53 |
| 409 | 714.47 | 707.36 | 391.72 | 416.62 | 487.39 | 16092.93 |
| 410 | 709.12 | 702.69 | 456.88 | 416.60 | 466.68 | 11919.92 |
| 411 | 705.87 | 679.85 | 6814.29 | 416.63 | 446.35 | 7048.48 |
| 412 | 701.45 | 657.30 | 12118.59 | 416.65 | 426.48 | 1572.26 |
| 413 | 695.40 | 634.87 | 16385.59 | 416.12 | 416.22 | 0.23 |
| 414 | 690.35 | 612.74 | 19632.73 | 416.10 | 416.13 | 0.16 |
| 415 | 684.95 | 590.89 | 21901.99 | 415.75 | 416.06 | 0.14 |
| 416 | 679.20 | 569.23 | 23202.66 | 415.70 | 416.00 | 0.13 |
| 417 | 671.37 | 547.88 | 23640.10 | 415.71 | 415.95 | 0.10 |
| 418 | 663.50 | 526.74 | 23185.94 | 415.72 | 415.91 | 0.07 |
| 419 | 390.07 | 505.90 | 21900.34 | 415.80 | 415.88 | 0.03 |
| 420 | 389.67 | 485.46 | 19867.04 | 416.02 | 415.86 | 0.02 |
| 421 | 389.10 | 465.36 | 17102.19 | 416.00 | 415.87 | 0.03 |
| 422 | 389.35 | 445.60 | 13660.88 | 415.77 | 415.90 | 0.03 |
| 423 | 389.48 | 426.18 | 9596.35 | 415.74 | 415.92 | 0.03 |
| 424 | 389.60 | 407.31 | 5023.09 | 415.70 | 415.95 | 0.03 |
| 425 | 388.87 | 388.97 | 0.33 | 415.87 | 415.95 | 0.03 |
| 426 | 388.81 | 388.87 | 0.25 | 416.05 | 415.96 | 0.03 |
| 427 | 388.75 | 388.78 | 0.21 | 416.12 | 415.96 | 0.03 |
| 428 | 388.80 | 388.73 | 0.21 | 415.92 | 415.92 | 0.04 |
| 429 | 388.85 | 388.67 | 0.19 | 416.25 | 415.88 | 0.08 |
| 430 | 388.55 | 388.60 | 0.14 | 416.12 | 415.83 | 0.14 |
| 431 | 387.97 | 388.55 | 0.07 | 416.05 | 415.80 | 0.16 |
| 432 | 388.35 | 388.57 | 0.10 | 416.05 | 415.76 | 0.18 |
| 433 | 388.30 | 388.61 | 0.14 | 415.82 | 415.70 | 0.19 |
| 434 | 388.57 | 388.65 | 0.18 | 415.85 | 415.62 | 0.21 |
| 435 | 388.37 | 388.69 | 0.21 | 416.05 | 415.56 | 0.23 |
| 436 | 388.37 | 388.72 | 0.24 | 415.47 | 415.48 | 0.21 |
| 437 | 388.42 | 388.78 | 0.27 | 415.15 | 415.40 | 0.19 |
| 438 | 388.40 | 388.87 | 0.23 | 414.97 | 415.33 | 0.17 |
| 439 | 388.80 | | | 415.25 | | |
| 440 | 389.30 | | | 415.24 | | |
| 441 | 389.36 | | | 415.22 | | |
| 442 | 389.37 | | | 414.95 | | |
| 443 | 389.37 | | | 415.00 | | |
| 444 | 389.37 | | | 415.00 | | |
| 445 | 389.37 | | | 415.00 | | |
| 446 | 389.37 | | | 415.00 | | |

One test that can be undertaken after carrying out a test to determine the value for the tire wearing angle for the wheels of the vehicle 10 is a test to determine if any play is present in the suspension system of the vehicle 10. The ability to assess other wheel conditions besides alignment is advantageous. Play in wheel suspension can cause a wheel to be angled in or out depending on whether the vehicle is moving forward or backward. To determine if there is play in the wheel suspension, the vehicle 10 is driven forward and the two distance measurements made. Then the vehicle is driven backward and the two distance measurements are made. Alternatively, the vehicle may be driven backwards first and then forwards. When moving backward, the first and second locations on the wheel are the same as the second and first locations when the vehicle is moving forward. If there is no play in the suspension, the sign of the offset between forward and backward motion of the vehicle should change (i.e. from positive to negative or from negative to positive).

For example, in one of the examples above, a value of 379.65 mm was found at the leading part of the wheel, and a value of 379.35 mm was found at the trailing part of the wheel when the vehicle was driven forward, for an offset of 0.30 mm. When driven backwards, if the wheels remain oriented exactly the same way a leading part value of 379.35 mm and a trailing part value of 379.65 mm will be obtained, providing an offset of −0.30 mm. If, however, there was play in the suspension, and the wheel shifted as a result of friction when being driven backwards, the values may be 379.35 (leading) and 379.65 (trailing) due to the shift in the orientation of the wheel, resulting in an offset of 0.30 mm again. Thus, if a change in the sign of the offset direction is not seen (i.e. if the sign of the offset remains the same), then there may be a suspension problem in one or both wheels being measured. Since, as discussed previously, wheel tracking problems may be caused by suspension play and the offset is also dependent on wheel tracking, such suspension information can be collected even when the wheels themselves are aligned properly. However, a more thorough inspection would be needed to determine whether the issue is a suspension issue or some other issue (e.g. relating, for example, to tire inflation).

With reference to FIG. 8, in some embodiments two displacement sensors may be provided on each apparatus A,B (apparatus A is shown in FIG. 8), wherein the two displacement sensors 3a and 3b are vertically aligned but spaced apart along the same vertical axis (shown at Av). For example, one at, for example, about one-third of the height of the wheel and another at, for example, about two-thirds of the height of the wheel, which permits the computer to measure wheel camber. More generally, providing two displacement sensors that are vertically aligned but spaced apart along the same vertical axis, and in particular two sensors that are positioned at symmetrical vertical distances above and below the center of the wheel 21, permits a determination of the camber of the wheel 21 using the offset between the two different distance measurements.

FIGS. 5A and 5B depict two suspension testing plates 38a,38b to assist in testing for play in the suspension components holding the vehicle wheels. The following description of the testing plates is with reference to FIG. 5A, but the one depicted in FIG. 5B has corresponding features discussed in relation to FIG. 5A. The suspension testing plates may include working surface 39 that have undulations 41 thereon. The undulations 41 include at least a first undulation 41a that slants downward laterally towards one side of the plate 38a and a second undulation 41b that slants downward laterally towards the other side of the plate 38a. By providing successive first and second undulations that slant towards opposite sides, any play in the wheel of the vehicle would cause the vehicle wheel to turn in when traveling over one of the undulations 41, and to turn out when travelling over the other of the undulations 41. By measuring the alignment of the wheel as it travels over both undulations 41a and 41b, it can be determined whether the alignment of the wheel changes from one undulation to the other, which would be indicative of play in the suspension elements holding the wheel.

As a vehicle 10 travels the weight of the vehicle 10 bears upon the suspension elements and through them, the wheels. Over time, even if there is play in the suspension elements, the weight of the vehicle may cause the joints where the play exists to seize to some degree. As a result, the play that exists in the suspension system is hidden in some situations even though it exists. To eliminate any effect from seizure of any joints, the plate 38a may further include bumps 40, which are provided so as to induce small, sharp movements in the wheel as the wheel travels over them. Such bumps 40 may be spaced relatively far apart such that each bump is individually configured to loosen any seized joints. Alternatively, the bumps may be spaced relatively close together so as to induce a vibration in the wheel as the wheel passes over them in an effort to loosen any seized suspension joints.

In the embodiment shown, the bumps 40 may be formed along the mating edges of successive generally triangular surfaces 42 that extend out of plane from one another by a selected angle.

If there were no suspension play at the vehicle wheel, the wheel would remain upright as it passes over the undulations 41 and so there would be no change in the distances measured to the points on the wheel. In other words, its degree of alignment would remain constant as it passed over the undulations 41. If however, there is play in the suspension, then the orientation of the wheel will change as the wheel passes over the undulations 41 and is subject to the changing forces from successive undulations that urge of the wheel in different directions. As a result, measurements of the wheel's alignment would change from one undulation to the next.

The novel features of the present invention will become apparent to those of skill in the art upon examination of the detailed description of the invention. It should be understood, however, that the scope of the claims should not be limited by the preferred embodiments set forth in the examples, but should be given the broadest interpretation consistent with the specification as a whole.

The invention claimed is:

1. A method of assessing a condition of a wheel on a vehicle, comprising:
    a) contactlessly determining a distance to a first location on the wheel at a first time;
    b) driving the vehicle in a direction generally parallel to the longitudinal centerline of the vehicle at least after the first time and at least before a second time that is later than the first time;
    c) contactlessly determining a distance to a second location on the wheel at the second time;
    d) determining an indication of a tire-wearing angle for the wheel based on the distance to the first location and the distance to the second location; and
    e) outputting the indication of the tire wearing angle for the wheel.

2. The method according to claim 1, wherein the first and second locations are on a side of the wheel and are both physically within about a 90 degree swept angle on the wheel from each other.

3. The method according to claim 1, wherein the first and second locations are on a side of the wheel and are both physically substantially the same point on the wheel.

4. The method according to a claim 1, wherein the wheel is turning on an axle and the first and second locations are forward and rearward of the axle when the respective distance determinations are made.

5. The method according to claim 1, wherein the first and second locations are on a sidewall of a tire that is part of the wheel.

6. The method according to claim 5, wherein the first and second locations are at a point of maximum bulge on the sidewall.

7. The method according to claim 1, wherein the vehicle is moving substantially perpendicular to a fixed path from at least one displacement sensor contactlessly determining the distances to the first location and the second location on the wheel.

8. The method according to claim 1, wherein step d) includes comparing the distance to the first location to the distance to the second location to determine an offset between the first and second locations on the wheel.

9. The method according to claim 8, further comprising making independent distance determinations on a corresponding wheel on an opposite side of the vehicle and correlating the offsets from both wheels to correct for the vehicle not tracking perpendicular to the fixed path.

10. The method according to claim 8, further comprising moving the vehicle forward and backward past the fixed path, determining offsets for the wheel when moving forward and when moving backward, and determining whether the offsets change sign, and indicating that a suspension problem may exist based at least in part on whether the offsets change sign.

11. A method of assessing a condition of a first front wheel, a second front wheel, a first subsequent wheel aft of the first front wheel and a second subsequent wheel aft of the second front wheel on a vehicle, comprising:

a) contactlessly determining a distance to a center of the first front wheel and distances related to an angle of the first front wheel;

b) contactlessly determining a distance to a center of the second front wheel and distances related to an angle of the second front wheel;

c) driving the vehicle in a direction generally parallel to the longitudinal centerline of the vehicle at least after the contactlessly determining the distance to the center of the first and second front wheels;

d) contactlessly determining a distance to a center of the first subsequent wheel and distances related to an angle of the first subsequent wheel after the driving;

e) contactlessly determining a distance to a center of the second subsequent wheel and distances related to an angle of the second subsequent wheel after the driving;

f) deriving adjusted tire wearing angles for each of the first and second front wheels and each of the first and second subsequent wheels based on the distances related to the angles determined in steps a), b), d), and e) and based on the distances to the centers of the wheels determined in steps a), b), d), and e); and g) outputting an indication of the adjusted tire wearing angles for the first and second front wheels and the first and second subsequent wheels.

* * * * *